US012249688B2

(12) United States Patent
Hillmyer et al.

(10) Patent No.: US 12,249,688 B2
(45) Date of Patent: Mar. 11, 2025

(54) POLYMER ELECTROLYTE MEMBRANES

(71) Applicant: REGENTS OF THE UNIVERSITY OF MINNESOTA, Minneapolis, MN (US)

(72) Inventors: Marc A. Hillmyer, Minneapolis, MN (US); Timothy Patrick Lodge, Minneapolis, MN (US); Lucas David McIntosh, Minneapolis, MN (US); Morgan Whitney Schulze, St. Louis Park, MN (US)

(73) Assignee: REGENTS OF THE UNIVERSITY OF MINNESOTA, Minneapolis, MN (US)

(*) Notice: Subject to any disclaimer, the term of this patent is extended or adjusted under 35 U.S.C. 154(b) by 332 days.

(21) Appl. No.: 17/563,217

(22) Filed: Dec. 28, 2021

(65) Prior Publication Data
US 2022/0123362 A1    Apr. 21, 2022

Related U.S. Application Data

(60) Division of application No. 14/666,715, filed on Mar. 24, 2015, now abandoned, which is a continuation of
(Continued)

(51) Int. Cl.
*H01M 10/05* (2010.01)
*H01M 10/052* (2010.01)
*H01M 10/0565* (2010.01)

(52) U.S. Cl.
CPC ..... *H01M 10/0565* (2013.01); *H01M 10/052* (2013.01); *H01M 2300/0082* (2013.01);
(Continued)

(58) Field of Classification Search
CPC .......... H01M 10/0565; H01M 10/052; H01M 2300/0082; H01M 2300/0085; H01M 2300/0091; Y02E 60/10
See application file for complete search history.

(56) References Cited

U.S. PATENT DOCUMENTS 4,654,279 A    3/1987   Bauer et al.
7,288,339 B2   10/2007  Cho
(Continued)

FOREIGN PATENT DOCUMENTS

JP    2007220496 A    8/2007
JP    2009/531820     9/2009
(Continued)

OTHER PUBLICATIONS

Perrin et al. "Polystyrene-block-poly(ethylene oxide-block-polystyrene: A New Synthesis Method Using Nitroxide-Mediated Polymerization from Poly(ethylene oxide) Macroinitiators and Characterization of the Architecture Formed." Macromolecules 2008, 41, 19, 6942-6951. (Year: 2008).*
(Continued)

*Primary Examiner* — Michael L Dignan
(74) *Attorney, Agent, or Firm* — Mueting Raasch Group

(57) ABSTRACT

Polymer electrolyte membranes (PEMs) that include co-continuous domains of a conductive phase and a crosslinked network phase. The conductive phase can include one or more polymers having glass transition temperatures below room temperature. The crosslinked network phase can be formed from at least one monofunctional monomer and at least one di- or greater functional monomer.

23 Claims, 12 Drawing Sheets

Related U.S. Application Data application No. PCT/US2014/039373, filed on May 23, 2014.

(60) Provisional application No. 61/827,301, filed on May 24, 2013.

(52) U.S. Cl.
CPC .............. *H01M 2300/0085* (2013.01); *H01M 2300/0091* (2013.01)

(56) References Cited

U.S. PATENT DOCUMENTS

| | | | |
|---|---|---|---|
| 8,703,310 | B2 | 4/2014 | Mullin et al. |
| 2007/0196740 | A1 | 8/2007 | Haruna et al. |
| 2009/0104523 | A1* | 4/2009 | Mullin ................ H01M 10/443 429/188 |
| 2010/0137460 | A1 | 6/2010 | Bert |
| 2010/0221614 | A1* | 9/2010 | Bertin ................ C08F 293/005 429/309 |
| 2012/0129045 | A1* | 5/2012 | Gin ................... H01M 10/0565 429/189 |
| 2013/0006392 | A1 | 3/2013 | Yang et al. |
| 2013/0130069 | A1 | 5/2013 | Mullin et al. |
| 2014/0088207 | A1 | 3/2014 | Elabd et al. |
| 2014/0272600 | A1* | 9/2014 | Bouchet ............. C08F 293/005 528/321 |
| 2015/0221980 | A1 | 8/2015 | Hillmyer et al. |

FOREIGN PATENT DOCUMENTS

| | | |
|---|---|---|
| JP | 2016512389 A | 4/2016 |
| WO | WO 98/22989 A1 | 5/1998 |
| WO | WO 2007/113236 A1 | 10/2007 |
| WO | WO 2007/142731 A2 | 12/2007 |
| WO | WO 2014/144056 A1 | 9/2014 |

OTHER PUBLICATIONS

Goujon et al. "Flexible Solid Polymer Electrolytes Based on Nitrile Nutadiene Rubber/Poly(ethylene oxide) Interpenetrating Polymer Networks Containing Either LiTFSI or EMITFSI." Macromolecules 2011, 44, 9683-9691. (Year: 2011).*

International Search Report and Written Opinion for PCT/US2014/039373, issued by the European Patent Office as the International Search Authority on Sep. 1, 2014; 16 pgs.

International Preliminary Report on Patentability for PCT/2014/039373, issue by the International Bureau of WIPO on Dec. 3, 2015; 12 pgs.

Chinese Patent Application No. 201480036220.8, filed May 23, 2014; Examiner Report issued Oct. 16, 2017; 6 pages (Chinese version) and 3 pages (English translation).

Car et al., "Tailor-made Polymeric Membranes based on Segmented Block Copolymers for $CO_2$ Separation," *Adv Funct Mater*, Sep. 23, 2008;18(18):2815-2823.

Lai et al., "Functional Polymers from Novel Carboxyl-Terminated Trithiocarbonates as Hightly Efficient RAFT Agents," *Macromolecules*, Aug. 27, 2002;35(18):6754-6756. Published online Aug. 2, 2002.

Larsen, "Intrinsically Hierarchical Nanoporous Polymers via Polymerization-Induced Microphase Separation" May 2017 Macromolecules, 50(11): 4363-4371.

McIntosh et al., "Evolution of Morphology, Modulus, and Conductivity in Polymer Electrolytes Prepared via Polymerization-Induced Phase Separation," *Macromolecules*, Feb. 27, 2015;48:1418-1428.

Richard Register, "Continuity through dispersity," Nature 483, 167-168 (Mar. 8, 2012).

Rzayev et al., "Nanochannel Array Plastics with Tailored Surface Chemistry," *JAmerChemSoc*, Sep. 28, 2005;127(38):13373-13379.

Schulze et al., "High-Modulus, High-Conductivity Nanostructured Polymer Electrolyte Membranes via Polymerization-Induced Phase Separation," *NanoLett*, 2014;14:122-126.

Simone et al., "Lyotropic Phase Behavior of Polybutadiene-Poly(ethylene oxide) Diblock Copolymers in Ionic Liquids," *Macromolecules*, 2008;41:1753-1759.

Singh et al. "Effect of Molecular Weight on the Mechanical and Electrical Properties of Block Copolymer Electrolytes" Macromolecules 2007, 40, 4578-4585 (Year: 2007).

Teran et al., "Effect of Molecular Weight on Conductivity of Polymer Electrolytes," *Solid State Ionics*, Nov. 16, 2011;203(1);18-21.

Tokuda et al., "Physiocochemical Properties and Structures of Room Temperature Ionic Liquids. 1. Variation of Anionic Species," *JPhysChem B*, Sep. 21, 2004;108(42):16593-16600. Published online Sep. 29, 2004.

Tokuda et al., "Physiocochemical Properties and Structures of Room Temperature Ionic Liquids. 2. Variation of Alkyl Chain Length in Imidazolium Cation," *JPhysChem B*, Apr. 7, 2005;109(13):6103-6110. Published online Mar. 12, 2005.

Widin et al. "Unexpected Consequences of Block Polydispersity on the Self-Assembly of ABA Triblock Copolymers," J. Am. Chem. Soc. 2012, 134, 3834-44.

Yan et al., "Enhanced Proton Conduction in Polymer Electrolyte Membranes as Synthesized by Polymerization of Protic Ionic Liquid-Based Microemulsions," *Chem Mater*, 2009;21(8):1480-1484.

* cited by examiner

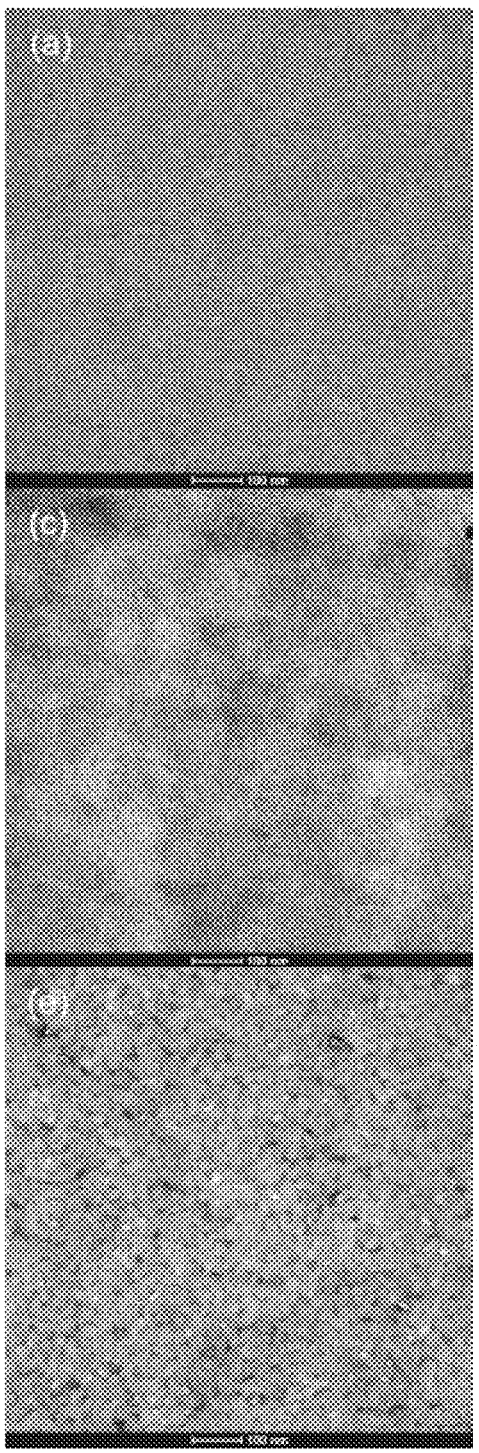
FIG. 7A
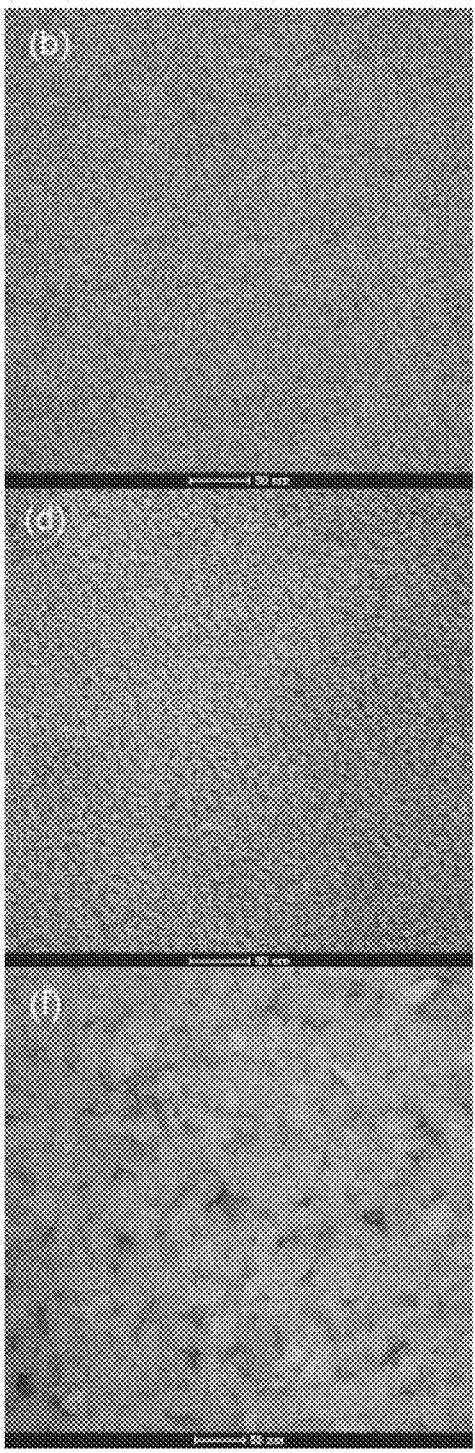
FIG. 7B
FIG. 7C
FIG. 7D
FIG. 7E
FIG. 7F

FIG. 8A
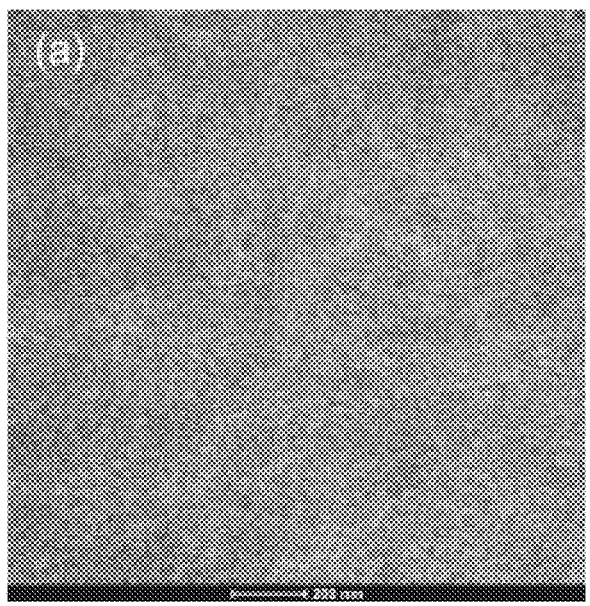
FIG. 8B
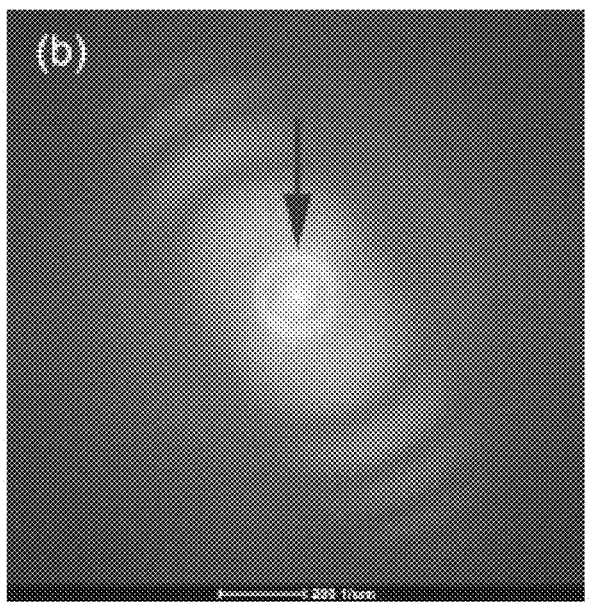
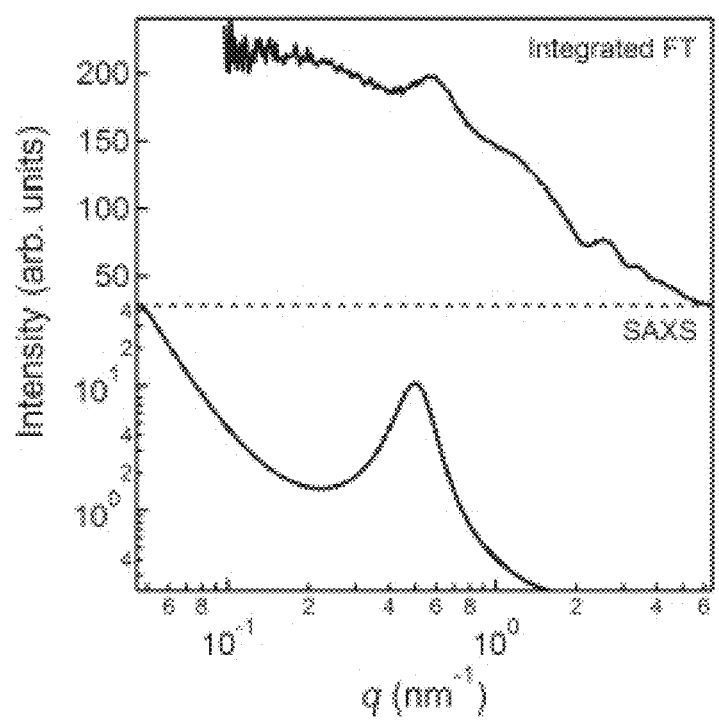
FIG. 8C

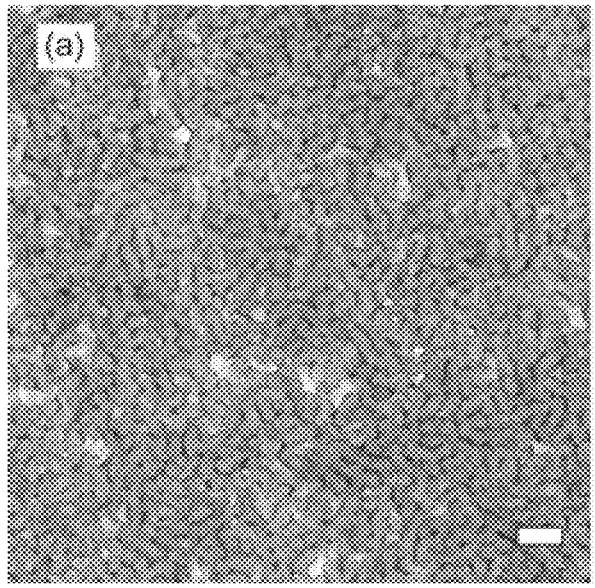
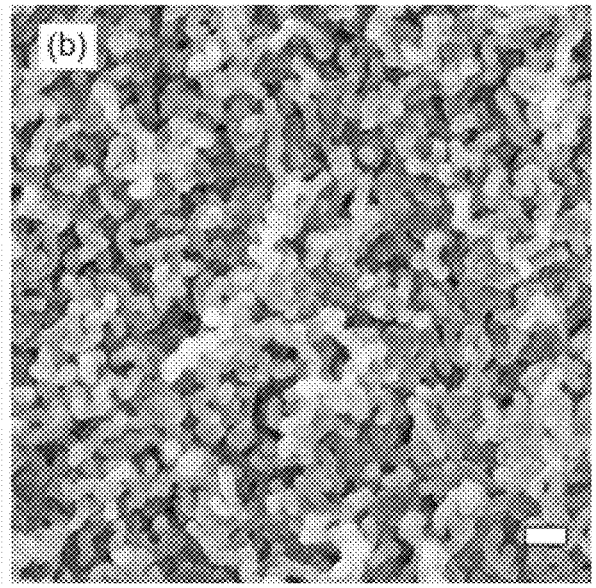
FIG. 9A          FIG. 9B
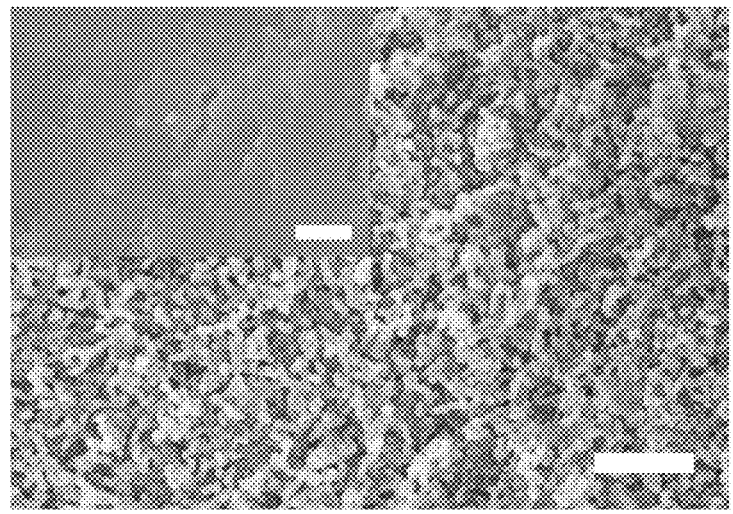
FIG. 10

POLYMER ELECTROLYTE MEMBRANES

RELATED APPLICATIONS

This application is a divisional of U.S. patent application Ser. No. 14/666,715, filed Mar. 24, 2015, which is a continuation of International Application Number PCT/US2014/039373, filed May 23, 2014, which claims the benefit of U.S. Provisional Patent Application No. 61/827,301, filed on May 24, 2013.

GOVERNMENT FUNDING

This invention was made with government support under DMR-1206459 and DMR-1006370 awarded by the National Science Foundation. The government has certain rights in the invention.

BACKGROUND

The future of solid-state lithium ion batteries requires an investment in materials research to produce an electrolyte that can ensure the necessary safety, cyclability, and high power density for implementation. The use of a pure lithium metal anode in a battery affords high energy density but can compromise the safe, long-term operation of the battery. Conventional liquid electrolytes in use are incompatible with the use of a lithium metal anode because they allow lithium dendrites to grow, which can lead to explosive failure. It has been shown that high modulus electrolytes can suppress dendritic growth, but their stiffness often does not afford the high ionic conductivity required for practical applications. Therefore, there remains a need for new electrolytes for use in solid-state lithium ion batteries.

SUMMARY

Disclosed are polymer electrolyte membranes (PEMs) that include co-continuous domains of a conductive phase and a crosslinked network phase. The conductive phase can include one or more polymers having glass transition temperatures below room temperature. The crosslinked network phase can be formed from at least one monofunctional monomer and at least one di- or greater functional monomer.

Also disclosed are batteries that include an anode, a cathode and a PEM disposed between the anode and the cathode. The PEM can include co-continuous domains of a conductive phase and a crosslinked network phase. The conductive phase can include one or more polymers having glass transition temperatures below room temperature. The crosslinked network phase can be formed from at least one monofunctional monomer and at least one di- or greater functional monomer.

Also disclosed are methods of forming a polymer electrolyte membrane. Such methods can include forming a reaction mixture, the reaction mixture including at least macromolecular chain transfer agent, monofunctional monomer, and di- or greater functional monomer; and forming a polymer electrolyte membrane from the reaction mixture.

These and various other features and advantages will be apparent from a reading of the following detailed description.

BRIEF DESCRIPTION OF THE FIGURES

FIGS. 7a, 7b, 7c, 7d, 7e, and 7f are low (FIG. 7a) and high (FIG. 7b) magnifications of 5 kDa PEO with no ionic liquid; low (FIG. 7c) and high (FIG. 7d) magnifications of 5 kDa PEO with 5 vol % ionic liquid; and low (FIG. 7e) and high (FIG. 7f) magnifications of 28 kDa PEO with no ionic liquid.

FIGS. 8a, 8b, and 8c are a low magnification transmission electron micrograph (TEM) (FIG. 8a); the corresponding Fourier transform (FT) (FIG. 8b) of the TEM micrograph; and a one dimensional plot (FIG. 8c) generated by azimuthally integrating the FT of the intensity vs. q.

FIGS. 9a and 9b are a TEM of a 28 kg/mol PEO-CTA and 21 vol % BMITFSI sample prior to etching; and a scanning electron micrograph (SEM) of the sample after etching PEO and BMITFSI with 57 wt % aqueous hydroiodic acid.

FIG. 10 are SEMS comparing a sample prepared with 28 kg/mol PEO-CTA and 21 vol % BMITFSI, before (inset) and after (main panel) etching out PEO/ionic liquid with 57 wt % hydroiodic acid.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
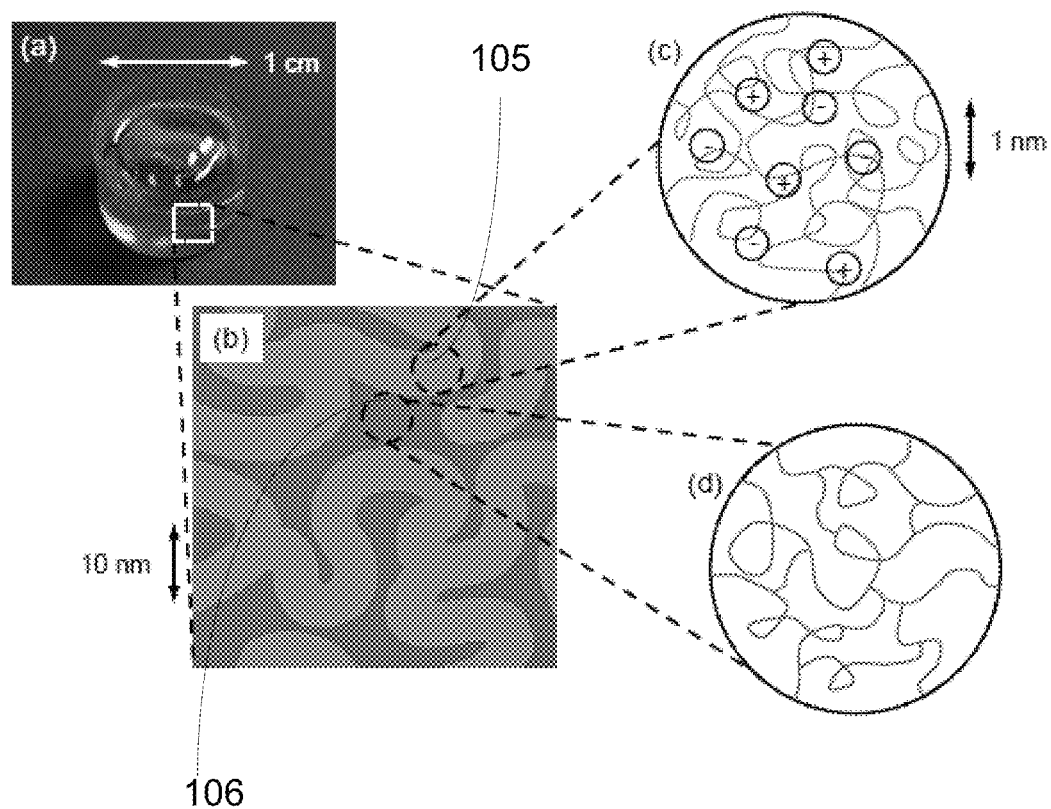
FIG. 1 includes a photograph (FIG. 1a) of a representative example of a disclosed polymer electrolyte membrane (PEM) sample; a schematic representation (FIG. 1b) of the compositional heterogeneity that exists on length scales on the order of 10 nm in a co-continuous morphology; a schematic representation (FIG. 1c) of the continuous conductive phase mixed with ionic liquid; and a schematic representation (FIG. 1d) of the continuous crosslinked network phase.

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

"Include," "including," or like terms means encompassing but not limited to, that is, including and not exclusive.

Disclosed herein are articles, methods of making such articles and articles or devices including such articles. Disclosed articles can be referred to as polymers, block polymers, and even more specifically, block copolymers. The articles can also be referred to by an illustrative intended use, as a membrane for use in batteries. As such, the articles can be referred to as polymer membranes, polymer electrolyte membranes (PEMs), or block polymer electrolyte membranes. It should be noted that the phrase polymer electrolyte membranes or PEMs may be used herein to refer to membranes that both include and do not include ionic species. Block polymer membranes disclosed herein may exhibit a co-continuity of domains to achieve an unprecedented duality of high mechanical modulus and high ionic conductivity. Previously utilized, linear diblock copolymers, on the other hand, relied on a high glass-transition temperature phase to impart desirable mechanical properties. Contrary to that, the disclosed PEMs, which are crosslinked, gain the advantage of a high modulus at all temperatures due to the rigidity of the network structure. Furthermore, the crosslinking can occur simultaneously in the formation of the block polymer and restricts the coarsening of formed micro-phase separated domains to produce a co-continuous morphology. Lastly, the conductivity of previously utilized similar systems has been surpassed by the incorporation of an ionic liquid additive that supports high conductivity in the pervasive network of conducting pathways.

Disclosed PEMs can be described as containing domains of a conductive phase and a crosslinked network phase. The domains can be co-continuous, meaning that each domain is independently substantially continuous. In some embodiments, disclosed PEMs contain conducting channels that are effective to allow permeation of ionic species from one face of the membrane to the other. Stated another way, in some embodiments, disclosed PEMs have conducting channels in which there are no, or only an inconsequential amount of channels that lead to a dead-end for ion transport. Co-continuous domains can be advantageous, especially when compared with lamellar systems, because they do not include grain boundaries, which can add resistance to ion transport in systems in which they are utilized.

FIG. 1 schematically illustrates the co-continuous morphology of the PEM. FIG. 1a shows a solution containing an exemplary PEM. FIG. 1b shows a schematic illustration of the structure of a disclosed PEM on a scale of tens of nanometers (nm). As seen there, such a PEM can have a conductive phase 105 and a crosslinked network phase 106. FIG. 1c shows a schematic illustration of the conductive phase on a nm scale, and includes optional salt (depicted by the + and − signs within the conductive phase). FIG. 1d shows a schematic illustration of the crosslinked network phase on a nm scale. The structure of the PEM can also be described as a micro-phase separated structure of, for example PEO/ionic liquid composite domains in a crosslinked framework of polymerized comonomers. In some embodiments, heterogeneity can be restricted to a nanometer length scale because of i) the initial miscibility of vinyl monomers, for example, and, ii) the connectivity of the growing polystyrene, for example, matrix that is immiscible in an ionic liquid and the PEO chains.

Materials for disclosed conductive phases can be chosen based on the ability to afford an atmosphere in which ionic components are mobile. In some embodiments, conductive phases can include one or more polymers whose glass transition temperatures are below room temperature. Such polymers can be described as low-softening-temperature polymers, or polymers that are in a rubbery state at room temperature. Specific illustrative materials that can be utilized for the conductive phase can include a polymer in which the polymer backbone includes polyethers, polyacrylates, polysiloxanes, polymethacrylates, or combinations thereof. In some embodiments, poly(ethylene oxide) PEO can be utilized.

In some embodiments, the conductive phase can be formed from a polymer that includes a chain transfer agent (CTA). During the course of the polymerization reaction, the CTA can be transferred to the growing polymer chains of the crosslinked phase. Chain transfer agents generally have at least one weak chemical bond, which can therefore facilitate a chain transfer reaction. Common chain transfer agents can include, for example thiols, such as thiocarbonylthio compounds. In some embodiments, a reversible addition-fragmentation chain transfer (RAFT) agent can be utilized. In some embodiments, a precursor of the conductive phase can include PEO including a RAFT agent. In such an embodiment, upon polymerization (with the at least one monofunctional monomer and the at least one di- or greater monomer) the PEO would remain in the conductive phase and the RAFT agent would become part of the polymer chains of the crosslinked phase.

Disclosed polymers or PEMs also include a continuous crosslinked network phase. The crosslinked network phase can also be described as the mechanically robust phase, the non-conductive phase, the matrix, the crosslinked matrix, or any combination thereof for example. The crosslinked network phase and/or monomers to form the same can be chosen based on the ability to provide desired properties, such as desired mechanical properties. The crosslinking that occurs in the formation of the crosslinked network phase restricts the morphology to one that is co-continuous. The crosslinked network phase can be formed from at least one monofunctional monomer and at least one di- or greater functional monomer. The inclusion of one or more di- or greater functional monomer affords the crosslinked nature of the crosslinked network phase. The crosslinked nature of the crosslinked network phase can provide mechanical robustness that can generally be present regardless of temperature.

Illustrative monofunctional monomers that can be utilized can include, for example styrene, 4-bromostyrene, tert-butyl styrene, maleic anhydride, maleic acid, methacrylic acid, vinyl pyridine, methyl methacrylate and acrylonitrile. In some embodiments, monofunctional monomers that can be considered high glass transition monomers, such as for example 4-bromostyrene, tert-butyl styrene, maleic anhydride, maleic acid, methacrylic acid, methyl methacrylate, and acrylonitrile may be utilized to increase the elastic modulus of the PEM. In some embodiments, monofunctional monomers for use in forming the crosslinked network phase can include at least styrene.

The particular monofunctional monomer that can be utilized can depend at least in part on the properties desired in the final PEMs. For example, if acrylonitrile is utilized, for example in place of styrene, the mechanical properties of the PEMs could be altered. Bulk poly(acrylonitrile) (PAN) has a melting temperature above 200° C., and a semi-crystalline structure, which results in both a high modulus and excellent non-linear mechanical properties. PEMs containing acrylonitrile may then be more likely to exhibit a higher modulus at a given salt concentration (when compared to PEMs without acrylonitrile or to PEMs with styrene) or, alternatively, PEMs with acrylonitrile could be loaded with more salt than PEMs that include styrene and still maintain a desired modulus.

The addition of at least a di-functional monomer affords the crosslinking in the crosslinked network phase. The addition of greater than di-functional monomers may afford a PEM that is more highly crosslinked, when compared to a PEM made only with di-functional monomers. More highly crosslinked PEMs could provide desired properties, and in some embodiments, combinations of di- and greater functional monomers may be chosen in order to specifically target a level of crosslinking or certain properties or certain ranges of properties that follow from a level of crosslinking. Illustrative di- or greater functional monomers that can be utilized can include, for example divinyl benzene and 4,4''-Divinyl-5'-(4-vinylphenyl)-1,1':3',1''-terphenyl, and other multifunctional vinyl monomers. In some embodiments, di-functional monomers for use in forming the crosslinked network phase can include at least divinyl benzene.

In some embodiments, a combination of a monofunctional monomer and a di-functional monomer can be utilized to form a crosslinked network phase. A specific example of such a combination includes styrene and divinylbenzene to form a crosslinked network phase. Another specific example of such a combination includes acrylonitrile and divinylbenzene. It should also be specifically noted that more than one monofunctional, more than one di- or greater functional, or both may be utilized.

In some embodiments, the ratio of the monofunctional monomer to the di- or greater functional monomer can be from 95:5 to 20:80 (monofunctional:di- or greater functional). In some embodiments, the ratio of the monofunction monomer to the di- or greater function monomer can be from 90:10 to 30:70 In some embodiments, the ratio of the monofunctional monomer to the di- or greater functional monomer can be about 4:1 (monofunctional:di- or greater functional). If too little di- or greater functional monomer is utilized, an equilibrium morphology typical of block polymer systems will be adopted. The co-continuous structure that forms is prevented from coarsening and achieving an equilibrium morphology by virtue of the in situ crosslinking. If too much of a di- or greater functional monomer is utilized, the PEM could become excessively crosslinked, leading to a PEM that is more brittle than desired or has disconnected phases.

The PEM can also be described, as discussed above, as a block copolymer formed in situ that micro-phase separates into a conductive phase and a crosslinked network phase. As such, the PEM can be described by the identity of the copolymer. In some embodiments, a PEM can include poly(ethylene oxide)-b-poly(styrene-co-divinylbenzene) (PEO-b-P(S-co-DVB).

The PEM can also be characterized by the amounts of the conductive phase and the crosslinked network phase. In some embodiments, there is independently at least 15% by volume of each component. In some embodiments, systems that include less than 15% by volume (within ±3%) of either phase may transition from a connected minor phase to isolated particles (in a majority matrix). In some embodiments, the PEM can contain from 15% to 85% by volume of the conductive phase. In some embodiments, the volume of the conductive phase includes the ionic component that is located within. In some embodiments, the crosslinked network phase is the majority by volume in the PEM. In some embodiments, the PEM can include from 20% to 70% by volume of the conductive phase. In some embodiments, the PEM can include from 21% to 66% by volume of the conductive phase.

A PEM can also include or be made to include an ionic component. The ionic component can include ionic liquids, alkali metal salts, such as lithium salts, or combinations thereof. Any known ionic liquids, alkali metal salts, or combinations thereof can be utilized herein. The ionic component can generally be described as located within the conductive phase of the PEM. The ionic component can be present upon formation, added later, or both. Illustrative materials that can be utilized as the ionic component can include 1-butyl-3-methylimidazolium bis(trifluoromethylsulfonyl)imide (BMITFSI), 1-ethyl-3-methylimidazolium bis(trifluoromethylsulfonyl)imide (EMITFSI), lithium bis (trifluoromethylsulfonyl)imide (LiTFSI), lithium hexafluorophosphate (LiPF$_6$), 1-ethyl-3-methylimidazolium hexafluorophosphate (EMIPF$_6$), 1-butyl-3-methylimidazolium hexafluorophosphate (BMIPF$_6$), or combinations thereof. It should be noted that the imides noted above may also be referred to by some as amides, i.e., BMITFSI could be referred to as BMITFSA.

The amount of the ionic component that can be included in a PEM can vary. The amount of the ionic component (ionic liquid, salt, or combination thereof) can be quantified by the overall volume fraction ($f_{IL}$) of the ionic component in the PEM. The volume fraction of the ionic component ($f_{IL}$) can be calculated as seen in Equation 1 below:

$$f_{IL} = \frac{\text{volume of iconic component}}{\text{volume of crosslinked network phase} + \text{volume of conductive phase}} \quad (1)$$

in which the volume of the conductive phase includes the volume of the ionic component and the volume of the polymer that form the conductive phase.

In some embodiments, $f_{IL}$ of disclosed PEMs can range from 0.00 to 0.70 (which could also be expressed as 0% to 70%). In some embodiments, $f_{IL}$ of disclosed PEMs can range from 0.00 to 0.66 (or 0% to 66%).

Disclosed PEMs can be utilized in batteries, such as solid-state lithium ion batteries. Disclosed PEMs can be disposed between an anode and a cathode of a battery, such as solid-state lithium ion battery. Disclosed PEMs may have properties that can be useful when utilized in a battery. For example, disclosed PEMs may exhibit co-continuity of domains, which can achieve a duality of high mechanical modulus and high ionic conductivity. In comparison, previously utilized linear diblock copolymers relied on a high glass-transition temperature phase to impart desirable mechanical properties. However, disclosed PEMs may gain the advantage of high modulus at all temperatures due to the rigidity of their network structure. Furthermore, the conductivity of previously utilized systems has been surpassed by the incorporation of an ionic liquid additive into disclosed PEMs that supports high conductivity in the pervasive network of conducting pathways.

Next-generation lithium ion batteries will likely utilize pure lithium metal as the anode to increase the energy density thereof (i.e., longer use between charges in a lower volume/mass battery). However, lithium metal anodes cannot be used with traditional liquid electrolytes because they allow growth of lithium metal dendrites, which can limit the overall battery lifetime and can lead to explosive failure. It has been demonstrated in the literature that stiff ($G>10^7$ Pa) polymer electrolytes inhibit growth of lithium metal dendrites. Disclosed PEMs may overcome the challenge of improving mechanical properties without sacrificing high conductivity via a heterogeneous morphology of co-continuous conductive pathways and mechanically robust domains. Mechanical properties of disclosed PEMs may offer properties which surpass presently available high glass transition linear diblock products. Furthermore, disclosed PEMs may simultaneously offer high modulus and exhibit ionic conductivity in excess of $10^{-4}$ S/cm at typical operating temperatures (>80° C.) when combined with appropriate ionic liquid(s) and/or salt(s)

Also disclosed herein are methods of making PEMs. In some embodiments disclosed methods can include forming a reaction mixture and forming a polymer electrolyte membrane (PEM) from that reaction mixture. Other optional steps may also be included in methods disclosed herein. Disclosed methods can also be more specifically described as utilizing controlled reversible addition-fragmentation chain transfer (RAFT) polymerization of a multifunctional monomer mixture from a macromolecular chain transfer agent. Disclosed methods can also be described as a strategy of polymer-induced phase separation (PIPS) involving a macromolecular chain transfer agent that is initially miscible with a solution of multifunctional monomers.

The reaction mixture can generally include a component that includes the material of the conductive phase. This can be more specifically described as the polymer block of the conductive phase. In some embodiments, the polymer block can include poly(ethylene oxide) (PEO) for example. In some embodiments, the polymer block of the conductive phase can be described by its molecular weight. The polymer block can include the polymers discussed above with respect to the conductive phase. In some embodiments, the polymer block can have an average molecular weight from 200 Da to 500 kDa for example. In some embodiments where the polymer block includes PEO, the molecular weight of the PEO can be from 1 kDa to 100 kDa, and in some embodiments the molecular weight of the PEO can be from 5 kDa to 30. This material can also include a chain transfer agent, for example a RAFT agent. This material can be referred to as a conductive polymer containing chain transfer agent or a macromolecular chain transfer agent. In some embodiments, macromolecular chain transfer agents can include PEO, for example. One specific exemplary macromolecular chain transfer agent can include an asymmetrically end-capped poly(ethylene oxide) synthesized by anionic polymerization or commercially available from, for example Sigma Aldrich (St. Louis, MO). A chain transfer agent, S-1-dodecyl-S'—(R,R'-dimethyl-R"-acetic acid) trithiocarbonate can be prepared as disclosed in Lai, J. T.; Filla, D.; Shea, R. *Macromolecules* 2002, 35, 6754-6756. This illustrative chain transfer agent can be coupled to the hydroxyl-terminus of PEO via an acid chloride intermediate to produce macromolecular PEO-CTA. Rzayev, J.; Hillmyer, M. A. *Journal of the American Chemical Society* 2005, 127, 13373-9.

The reaction mixture can also include at least one monofunctional monomer and at least one di- or or greater functional monomer. The monofunctional and di- or greater functional monomer can generally be as described above. For example, the monofunctional monomers can be selected from example 4-bromostyrene, tert-butyl styrene, maleic acid, maleic anhydride, methacrylic acid, methyl methacrylate. acrylonitrile; and the di- or greater functional monomers can be selected from divinyl benzene and other difunctional vinyl monomers.

Reaction mixtures can also include other optional components. Exemplary types of optional components can include, for example, solvents and initiator. The amounts and particular uses of such components would be known to one of skill in the art, having read this specification.

The reaction mixture can generally include amounts of components that obtain desired volumetric amounts of the conductive phase and the crosslinked network phase in the final PEM. In some embodiments, the reaction mixture can include from 30% to 35% by weight of the macromolecular chain transfer agent (with respect to the weight of the total of the macromolecular chain transfer agent, the monofunctional monomer and the di- or greater functional monomer).

Disclosed methods can also include forming a polymer electrolyte membrane (PEM) from the reaction mixture. This step can occur without intervention once the reaction mixture is formed or can happen after other optional steps (discussed below).

An optional step that can also be included in disclosed methods is the step of removing one or more components from the reaction mixture. For example, in some embodiments, one or more of the monomers that are included in the reaction mixture may include inhibitors. In such embodiments, inhibitors are removed prior to the addition of the monomer to the reaction mixture (for example by passing through a basic alumina column or by distillation thereof).

Another optional step that can also be included in disclosed methods includes heating the reaction mixture. In some embodiments, the application of heat may or may not be necessary in order to form the PEM from the reaction mixture, or may or may not function to increase the speed at which the PEM is formed from the reaction mixture. In some embodiments, the reaction mixture can be heated to 100° C. or greater, for example 120° C. in some embodiments.

Another optional step that can also be included in disclosed methods includes mixing the reaction mixture. This can be accomplished, if desired via devices such as magnetic stir bars, sonication, etc. Other optional processing steps can also be undertaken which would be known to one of skill in the art, having read this specification.

Another optional step that can also be included in disclosed methods includes the addition of an ionic component to the reaction mixture. This optional step, if utilized can provide a processing advantage. Disclosed methods can offer a direct method to produce block polymer electrolytes that circumvent the current multi-step approach of incorporating conductive salts following arduous block polymer synthesis and isolation. Disclosed methods can also produce extensive simultaneous crosslinking in one phase of the block polymer and impart a relatively high modulus that is maintained at temperatures above the glass transition of a corresponding polymer of linear molecular architecture.

The ionic component will partition selectively in the conductive phase of the PEM. In some embodiments, the ionic component can simply be added to the reaction mixture along with the other components. The ionic components are generally as described above, with any known ionic liquids, alkali metal salts, or combinations thereof useful herein.

The ionic component can also be added to the PEM after it is formed. The addition of the ionic component after the PEM is formed can be done in place of the addition while it is being formed or in addition to adding it while the PEM is formed. In embodiments where the ionic component is added while the PEM is formed and after it is formed, a higher loading of the ionic component may be able to be obtained.

Another optional step can include applying the reaction mixture to a surface before or while the PEM is being formed from the reaction mixture. In some embodiments, the reaction mixture can be applied, for example via a coating method, to a surface before the PEM is being formed therefrom.

The present disclosure is illustrated by the following examples. It is to be understood that the particular examples, assumptions, modeling, and procedures are to be interpreted broadly in accordance with the scope and spirit of the disclosure as set forth herein.

EXAMPLES

Materials

Unless otherwise noted herein, all reagents were purchased from Sigma Aldrich (St. Louis, MO) and were used without further treatment. Inhibitor was removed from the monomer employed by passing it through an alumina column.

Formation of PEO-CTA

Asymmetrically end-capped poly(ethylene oxide) was synthesized by anionic polymerization from a potassium tert-butoxide initiator (1.0 M in THF) using standard schlenck techniques (28 kDa PEO, Đ=1.03) or purchased from Sigma Aldrich (5 kDa PEO, Đ=1.11). S-1-dodecyl-S'—(R,R'-dimethyl-R"-acetic acid) trithiocarbonate (CTA), prepared as reported in Lai, J. T.; Filla, D.; Shea, R. *Macromolecules* 2002, 35, 6754-6756, was readily coupled to the hydroxyl-terminus of PEO via an acid chloride intermediate to produce macromolecular PEO-CTA (Rzayev, J.; Hillmyer, M. A. Journal of the American Chemical Society 2005, 127, 13373-9). SEC traces of linear PEO-b-PS block copolymers prepared and initiated from PEO-CTA in the bulk polymerization of styrene monomer had narrow molecular weight distributions. This result supported complete end-functionalization of PEO and agreed with end-group analysis performed using $^1$H-NMR spectroscopy.

Formation of Ionic Liquids

The ionic liquid 1-butyl-3-methylimidazolium bis(trifluoromethylsulfonyl)imide (BMITFSI) was prepared following established procedures (Tokuda, H.; Hayamizu, K.; Ishii, K.; Susan, M. A. B. H.; Watanabe, M. The Journal of Physical Chemistry B 2004, 108, 16593-16600 and Tokuda, H.; Hayamizu, K.; Ishii, K.; Susan, M. A. B. H.; Watanabe, M. The Journal of Physical Chemistry B 2005, 109, 6103-6110) A 10% molar excess of 4-chlorobutane was mixed with 1-methylimidazole in a round bottom flask, and cyclohexane was added to the reagents at a volumetric ratio of 10/1. The mixture was heated to reflux conditions and stirred vigorously overnight. Cyclohexane was removed via rotovap and the product, 1-butyl-3-methylimidazole chloride (BMICl), was dried at 60° C. under dynamic vacuum overnight. Lithium bis(trifluoromethylsulfonyl)imide was added to BMICl at 10% molar excess, assuming complete conversion in the first step. DI water was added at a volumetric ratio of 10/1, and the mixture was heated to 70° C. and stirred vigorously for 24 hours. The resulting solution phase-separated into BMITFSI and an aqueous phase containing LiCl. BMITFSI was washed with distilled water three times and purified by passing through an alumina column. 1H-NMR spectroscopy was used to confirm the final product. The ionic liquid was dried at elevated temperature under dynamic vacuum for 2 days before use.

The ionic liquid 1-eutyl-3-methylimidazolium bis(trifluoromethylsulfonyl)imide (EMITFSI) was prepared following established procedures (Tokuda, H.; Hayamizu, K.; Ishii, K.; Susan, M. A. B. H.; Watanabe, M. The Journal of Physical Chemistry B 2004, 108, 16593-16600 and Tokuda, H.; Hayamizu, K.; Ishii, K.; Susan, M. A. B. H.; Watanabe, M. The Journal of Physical Chemistry B 2005, 109, 6103-6110). Lithium bis(trifluoromethylsulfonyl)imide was added to EMICl at 10% molar excess. DI water was added at a volumetric ratio of 10/1, and the mixture was heated to 70° C. and stirred vigorously for 24 hours. The resulting solution phase-separated into EMITFSI and an aqueous phase containing LiCl. EMITFSI was washed with distilled water three times and purified by passing through an alumina column. 1H-NMR spectroscopy was used to confirm the final product. The ionic liquid was dried at elevated temperature under dynamic vacuum for 2 days before use.

Formation of Polymer Electrolyte Membranes (PEMs)

Simultaneous in situ formation of a block polymer with chemical crosslinking in the presence of ionic liquid was used to form co-continuous domains with additive properties of high ionic conductivity and high modulus. This strategy employed a process of controlled reversible addition-fragmentation chain transfer (RAFT) polymerization from a macromolecular chain transfer agent to induce a bicontinuous morphology preserved by the constraints of the crosslinker in the polymerization of the second block. The synthetic strategy of polymerization-induced phase separation (PIPS), in this case, involves a macromolecular chain transfer agent of poly(ethylene oxide) initially miscible with a solution of styrene, divinylbenzene and ionic liquid. The preferential partitioning of the ionic liquid to the domains of the polyether to form conductive channels is driven by their matched incompatibility with the growing crosslinked poly (styrene).

Figure 2:
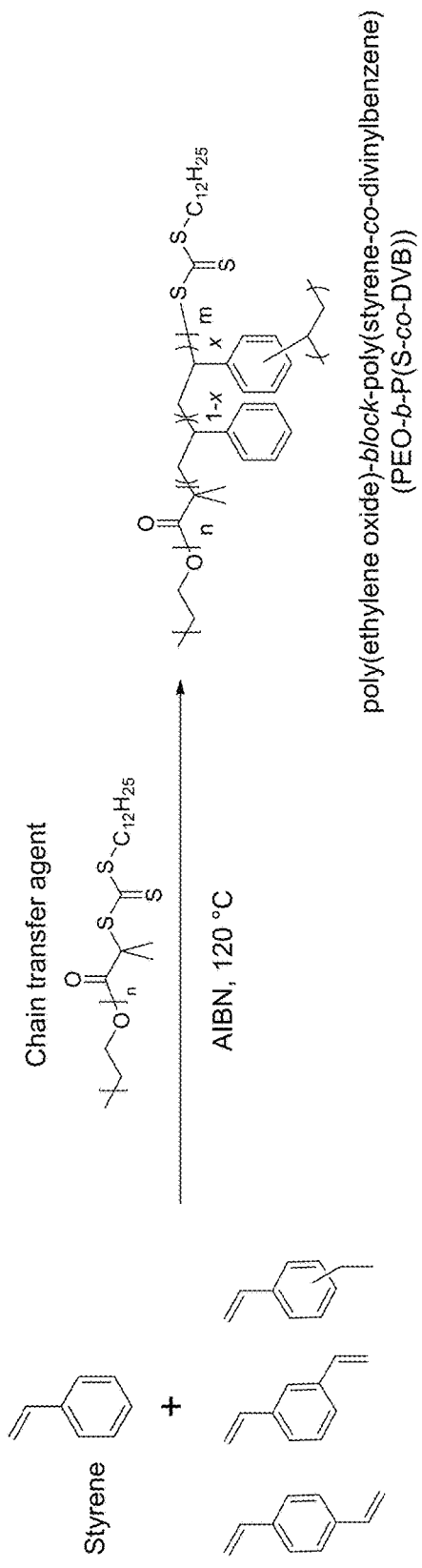
FIG. 2 is an example of a chemical reaction utilized to synthesize a disclosed PEM and exemplary ionic liquids that can be utilized therein.
Figure 2:
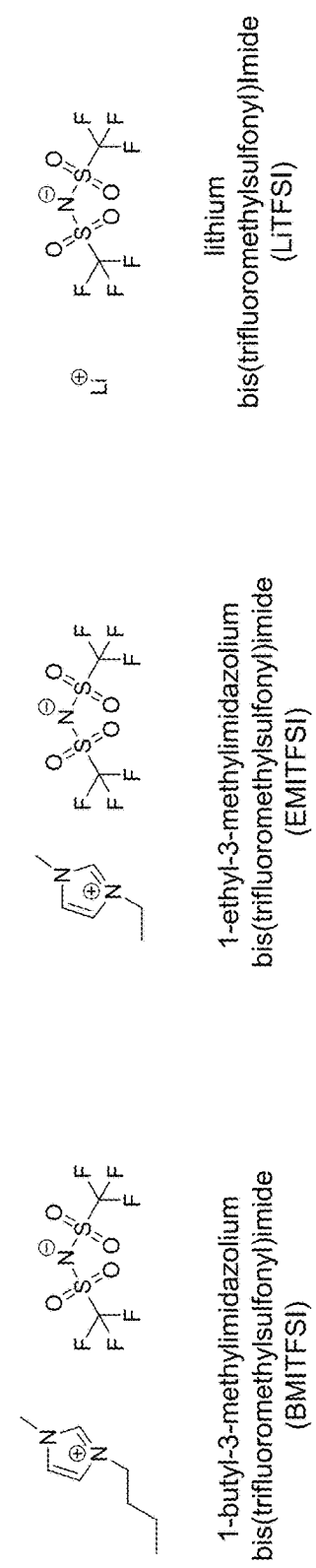

The copolymerization of styrene and divinylbenzene monomers from a poly(ethylene oxide) (PEO) chain transfer agent in the presence of the ionic liquid, 1-butyl-3-methyl-imidazolium bis(trifluoromethylsulfonyl)imide (BMITFSI), produces a micro-phase separated structure of PEO/ionic liquid composite domains in a crosslinked framework of polymerized comonomers. FIG. 2 shows the chemical reaction scheme used, as well as chemical structures of the exemplary ionic liquids/salts that were incorporated into the PEMs. FIG. 1 shows that the heterogeneity in this exemplary PEM is restricted to a nanometer length scale. This is likely because of i) the initial miscibility of vinyl monomer, but more importantly, ii) the connectivity of growing polystyrene matrix that is immiscible ionic liquid and PEO chains.

Reactions to produce polymer electrolyte membranes were performed in a glass vial without degassing. A solution maintained at 32 wt % PEO-CTA was prepared by the sequential addition of macro-CTA, styrene (≥99%), and divinylbenzene (80%, tech.), where the monomer molar ratio was maintained at about 4:1, respectively. BMITFSI was added to a predetermined concentration, and the entire solution was well-mixed prior to heating to 120° C. to auto-initiate styrene. AIBN was utilized as an external initiator (0.05 eq to PEO-CTA) for uniform generation of radicals to prevent or diminish density inhomogeneities that may have otherwise occurred. These inhomogeneous changes in density can induce cracks during polymerization). The mixture formed into a solid monolith. The solid monolith was sanded to a flat surface having a thickness of about 500 μm for additional analysis.

A series of PEO-b-P(S-co-DVB) PEMs were prepared using 5 and 28 kDa PEO-CTA dissolved and maintained at a constant concentration of 32±1 wt % in a 4:1 molar mixture of styrene:divinylbenzene. Ionic liquid (IL) was independently added to higher concentrations. Samples are identified herein by the molecular weight of the PEO utilized (5 or 28 kDa) and $f_{IL}$, the overall volume fraction of ionic liquid.

PEO-b-P(A-co-DVB) PEMS were prepared using 5 and 28 kDa PEO-CTA dissolved and maintained at a constant concentration of 32±1 wt % in a 4:1 molar mixture of acrylonitrile:divinylbenzene. Ionic liquid (IL) was independently added to higher concentrations. Samples are identified herein by the molecular weight of the PEO utilized (5 or 28 kDa) and $f_{IL}$, the overall volume fraction of ionic liquid.

Analysis of PEMs
Differential Scanning Calorimetry

Differential scanning calorimetry (DSC) experiments were performed on a TA Instruments Discovery DSC. Samples for measurement were prepared using standard aluminum T-zero pans with standard or hermetic lids. Each sample was annealed at 200° C. for 5 min. Subsequent cooling and heating ramps were applied at 5° C./min. Heats of fusion were estimated from the endotherm of the second heating and the weight fraction of PEO incorporated into the crosslinked block polymer. Percent crystallinity was calculated in reference to the enthalpy of fusion of 213.4 J/g for pure crystalline PEO.

Small-Angle X-Ray Scattering

Small-angle X-ray scattering (SAXS) experiments were performed at the Argonne National Lab Advanced Photon Source beamline 5-ID-D, which is maintained by the DuPont-Northwestern-Dow Collaborative Access Team. Samples were exposed at room temperature to synchrotron-source X-rays with a nominal wavelength of 0.729 Å. Scattered X-rays were collected on a 2DMAR CCD located at a sample-to-detector distance of 5680 mm. The sample-to-detector distance was calibrated using a silver behenate standard, and intensity was calibrated with glassy carbon. 2-D SAXS intensity was reduced to a function of the magnitude of the scattering vector, q, by azimuthally integrating the 2-D data. q is given by $q=4\pi \sin(\theta/2)/\lambda$, where $\lambda$ is the vacuum X-ray wavelength and $\theta$ is the angle of scattered photons relative to the incident beam.

Figure 3:
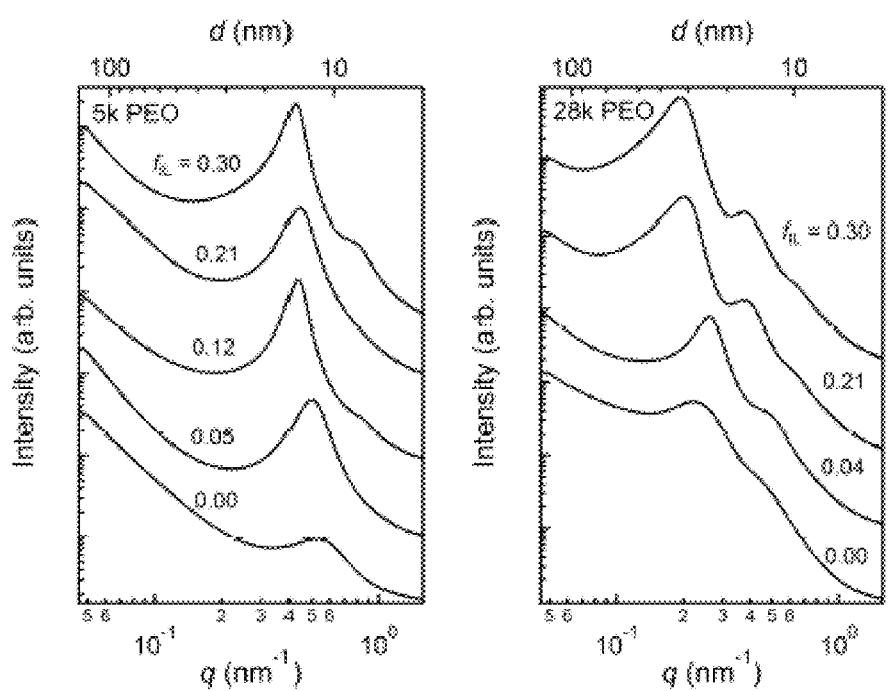
FIG. 3 shows small angle X-ray scattering (SAXS) data for PEMs samples prepared with 5 and 28 kDa poly(ethylene oxide) (PEO) and various concentrations of the ionic liquid BMITFSI.

FIG. 3 shows the synchrotron SAXS data for the samples. The scattering profiles of all samples exhibited a broad primary peak at low q and a more pronounced secondary shoulder as the ionic liquid concentration was increased. The breadth of the peaks are characteristic of disordered, but microphase-separated structure. The peak at low q corresponds to the primary length scale of compositional heterogeneities between the PEO/IL and P(S-co-DVB) domains. This primary length scale increased with an increase in the molecular weight of PEO: 10-15 nm for 5 kDa PEO versus 25-35 nm for 28 kDa PEO because there was an effective increase in the size of PEO channels as the molecular weight was increased. The position of the primary peak shifted to lower q and its intensity grew as more ionic liquid was added because of the increase in the effective interaction parameter as ionic liquid preferentially swells the PEO domains. This increased interaction parameter also contributed to an increase in the local order, as indicated by the development of higher order reflections. The increased segregation strength can result in decreased interfacial thickness and an increased persistence length of the otherwise tortuous domains, resulting in a lamellar-like local order that minimizes unfavorable contacts between opposing domains.

Figures 4A, 4B:
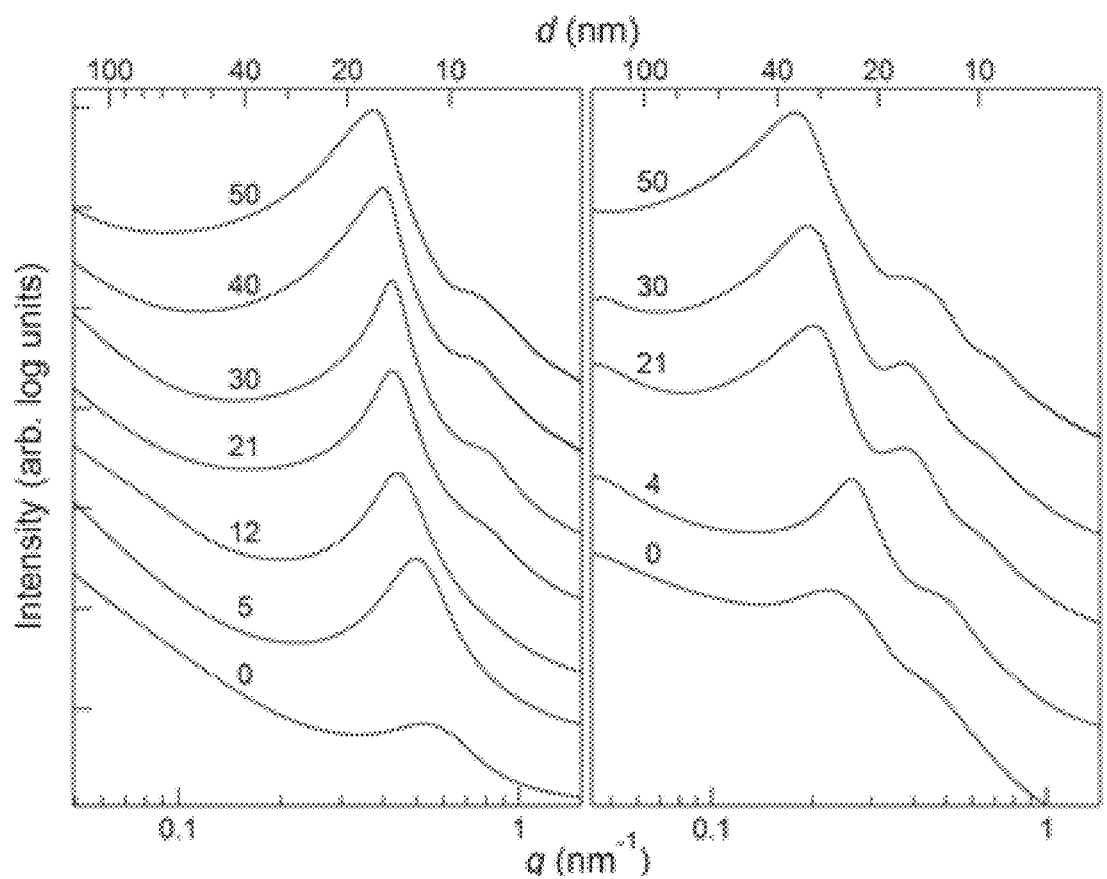
FIGS. 4a and 4b show SAXS data for PEMs samples prepared with 5 (FIG. 4a) and 28 kDa (FIG. 4b) poly(ethylene oxide) (PEO) and various concentrations of the ionic liquid BMITFSI.

FIGS. 4a and 4b show SAXS data for samples prepared with 5 (FIG. 4a) or 28 kg/mol (FIG. 4b) PEO-CTA and the ionic liquid BMITFSI. All samples were exposed at room temperature. The top axis shows the d-spacing, which is given as $d=2\pi/q$. BMITFSI concentration is reported by the numbers in the graph as overall vol %.

Figure 5:
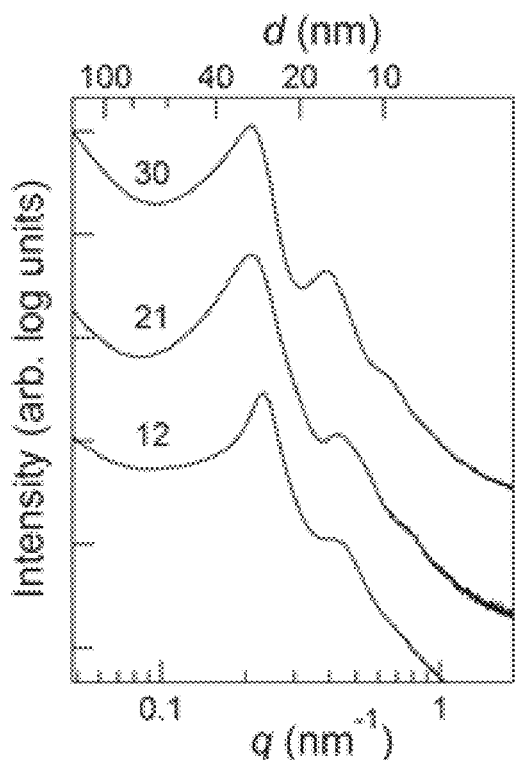
FIG. 5 shows SAXS data for PEMs samples prepared with 28 kDa poly(ethylene oxide) (PEO) and various concentrations of the ionic liquid EMITFSI.

A series of materials were prepared that demonstrate the compatibility of additional ionic liquids, for example 1-ethyl-3-methylimidazolium bis(trifluoromethylsulfonyl) imide (EMIF SI) in the synthesis of PIPS PEMS. FIG. 5 shows SAXS data for samples prepared with 28 kg/mol PEO-CTA (32 wt %) and the ionic liquid (EMITFSI). The numbers next to each trace in FIG. 5 are the overall ionic liquid concentration. EMITFSI, in comparison to BMITFSI, has a higher conductivity, specifically about 3 times higher than BMITFSI. The SAXS data (in FIGS. 4a and 4b for example) are qualitatively consistent with results previously observed with BMITFSI, namely the lack of sharp Bragg diffraction peaks, suggesting little to no long-range periodic order. However, the observed peaks are sharper with EMITFSI relative to BMITFSI, and the higher order peaks are more prominent. Both of these observations could be considered consistent with an increase in segregation strength between poly(styrene) and EMITFSI, as compared to BMITFSI. Furthermore, as seen from this result, the PIPS reaction strategy can be extended to numerous ionic liquids.

Figure 6:
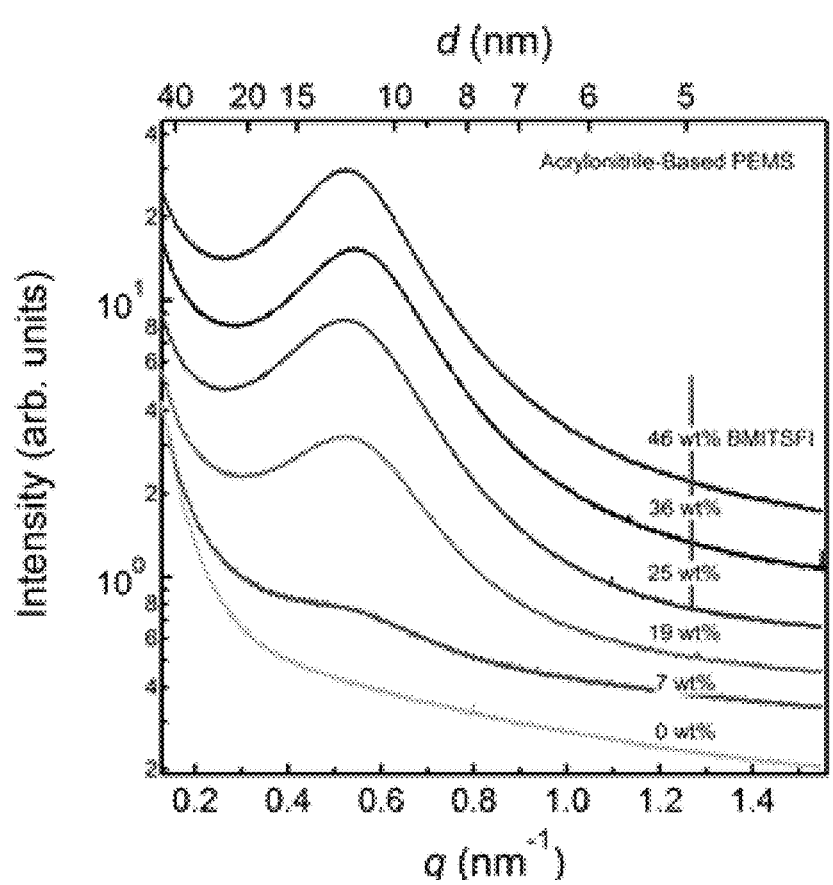
FIG. 6 shows SAXS data for PEMs with 5 kg/mol PEO-CTA and a 4/1 molar ratio of acrylonitrile/divinylbenzene and various concentrations of BMITF SI.

FIG. 6 shows SAXS data for samples prepared with 5 kg/mol PEO-CTA and 4/1 molar ratio acrylonitrile/divinylbenzene. Replacing styrene with acrylonitrile may serve to alter, for example improve the mechanical properties of a resulting PIPS PEMs. Bulk poly(acrylonitrile) (PAN) has a melting temperature above 200° C., and a semi-crystalline structure. These properties result in both a relatively high modulus and excellent non-linear mechanical properties. PEMS made using acrylonitrile in place of styrene may also then exhibit higher modulus at a given salt concentration or, alternatively, membranes could be loaded with more salt than poly(styrene)-based samples and still maintain some requisite modulus. The SAXS data in FIG. 6 were obtained with samples having an increasing concentration of the ionic liquid BMITFSI. The sample prepared without ionic liquid does not exhibit a scattering peak, suggesting homogeneous mixing of the PEO and PAN or low electron-density contrast. The addition of BMITFSI, which is likely to segregate to the PEO domain, may induce microphase separation between PEO and PAN. Alternatively, the selective inclusion of BMITFSI in the PEO domain may enhance the electron density contrast between the PEO and the PAN domain. Both hypotheses are consistent with the emergence of a single, broad scattering peak with the addition of BMITFSI.

Transmission Electron Microscopy

Bulk PEMs samples were microtomed at room temperature on a Leica UC6 Ultramicrotome to achieve sections with a nominal thickness of about 70 nm. Sample sections were collected on a 300 mesh copper grid and were stained with the vapor of a 0.5 wt % $RuO_4$ aqueous solution for about 15 minutes. On this time-scale, $RuO_4$ preferentially stains poly(ethylene oxide), which appears dark in TEM images. Sections were imaged at room temperature on an FEI Tecnai G2 Spirit Bio-TWIN using an accelerating voltage of 120 kV. Images were collected by a 2048×2048 pixel CCD. TIA or ImageJ software was used to generate Fourier transforms (FTs) of TEM images, and length-scale data stored in the TEM image files were used to calibrate features observed in the FTs.

Representative TEM micrographs in FIGS. 7a, 7b, 7c, 7d, 7e, and 7f compare the morphology of samples prepared with 5 and 28 kDa PEO and the inclusion of BMITFSI. Each row of images is the same sample at a low and a high magnification. FIGS. 7a and 7b are 5 kDa PEO with no ionic liquid. FIGS. 7c and 7d are 5 kDa PEO with 5 vol % ionic liquid. FIGS. 7e and 7f are 28 kDa PEO with no ionic liquid.

During the 15 min $RuO_4$ stain used to increase the contrast, amorphous PEO was preferentially stained and appears dark in the images. In general, the TEM images show segregated domains that are locally correlated with no long-range order, consistent with the structure factor observed in SAXS experiments. Furthermore, the length scales observed in TEM (in particular, the center-to-center—distance of adjacent light and dark regions) are consistent with the preferred spacing corresponding to the position of the principal scattering vector. Finally, although assumptions of domain continuity are not proven via the effectively two-dimensional slices, these images certainly do not preclude bicontinuity.

To quantify the correlation length-scale observed in TEM, Fourier transforms (FTs) of low-magnification TEM images were generated. FIG. 8a shows Fourier transform (FT) analysis of a low magnification transmission electron micrograph of a PEMs samples prepared with 5 kDa PEO and 5 vol % ionic liquid. Low magnification was required so the FT can average over many domains (light and dark regions in the TEM image). FIG. 8b shows the corresponding Fourier transform, as generated by Tecnai TIA software. Length-scale data in the image file was used to calibrate features in the FT. The FT exhibited an isotropic ring, indicated by the arrow, at low q. The pixel intensity was integrated azimuthally to generate a one-dimensional plot of intensity vs q (FIG. 8c). The low q feature seen in the FT shows excellent agreement with the primary peak seen in SAXS experiments, confirming that the TEM images accurately represent bulk morphology.

FIGS. 9a and 9b show complementary transmission (FIG. 9a) and scanning electron (FIG. 9b) micrographs of polymer electrolytes membranes (PEMs) prepared as discussed above. Both samples were prepared with a poly(ethylene oxide) macro-chain transfer agent (PEO-CTA) with a molar mass of 28 kg/mol, a 4/1 molar ratio of styrene/divinylbenzene, and 21 overall vol % of the ionic liquid BMITFSI. In the TEM image (FIG. 9a), the dark regions are PEO/BMITFSI (a result of $RuO_4$ staining), and the bright regions are crosslinked polystyrene. In the SEM image (FIG. 9b), the pores correspond to domains of PEO/BMITFSI, which were etched during the acid treatment. The remaining network structure of crosslinked poly(styrene) appears bright. The remaining structure is crosslinked polystyrene. The sample was coated with 1-2 nm of Pt prior to imaging. Both scale bars represent 100 nm. Both TEM and SEM show spatial compositional heterogeneity on length scales of ca. 20-30 nm. Furthermore, the domains lack long-range periodic order. These observations are consistent with small-angle X-ray scattering data, which feature a broad primary scattering peak and few, if any, higher order peaks. FIG. 10 shows the results of a control SEM experiment of a PEM sample prepared with 28 kg/mol PEO-CTA and 21 vol % BMITFSI before (inset) and after (main panel) etching out the PEO/ionic liquid with 57 wt % hydroiodic acid. Both samples were freeze-fractured to expose a fresh surface and were coated with 1-2 nm of Pt prior to imaging. Both scale bars represent 500 nm. This confirms the observed porous network structure results from etching the PEO/BMITFSI domain. As shown in the inset, the topography of the sample before the etching treatment does not exhibit a porous structure.

Figures 11A, 11B:
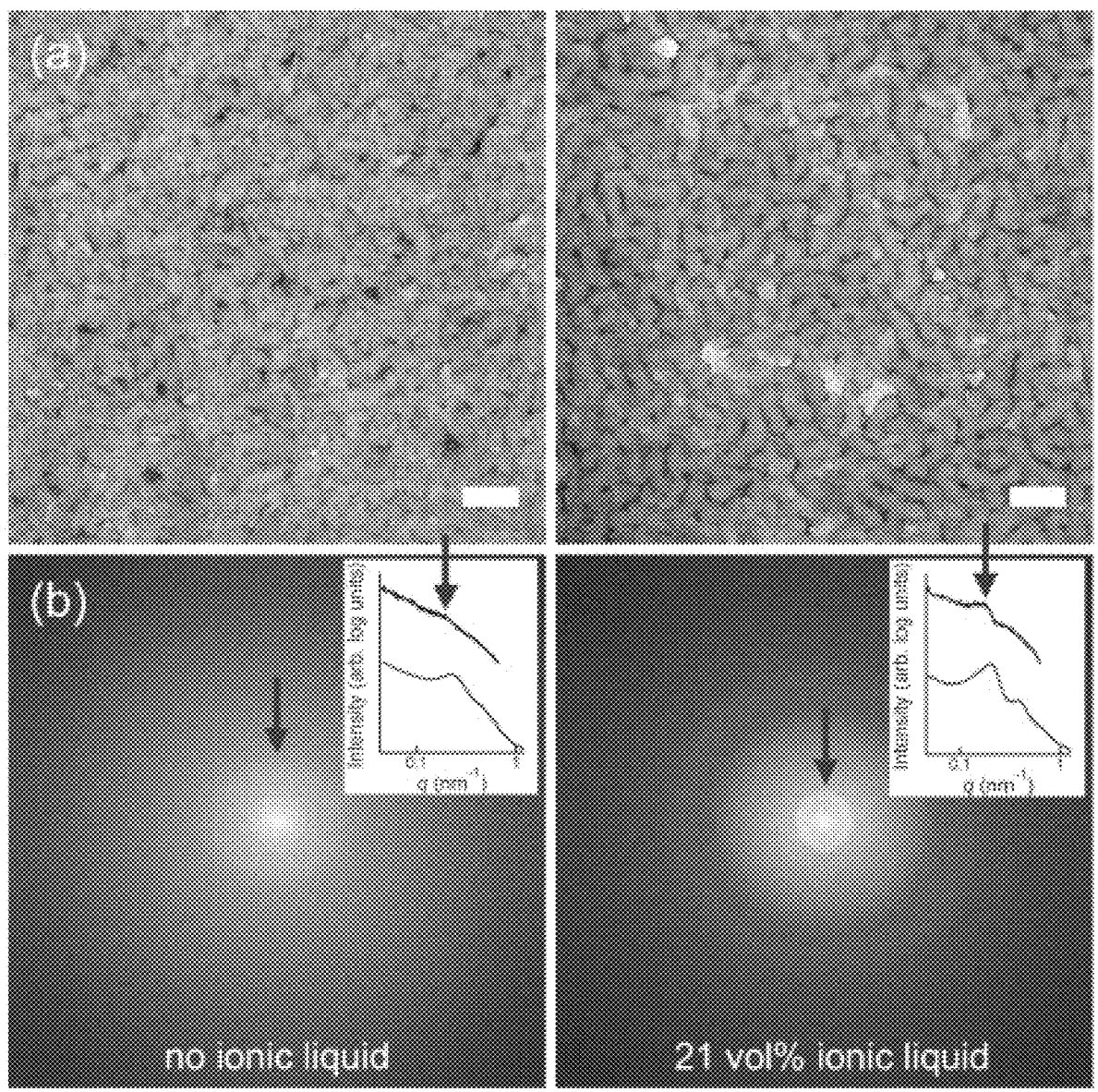
FIG. 11a shows TEMs of polymer electrolyte membrane samples prepared from 28 kg/mol PEO-CTA without ionic liquid and with 21 vol % BMITFSI.
FIG. 11b shows the corresponding Fourier transform (FT) analysis thereof.

FIG. 11a shows TEMs of polymer electrolyte membrane samples prepared from 28 kg/mol PEO-CTA without ionic liquid and with 21 vol % BMITFSI. RuO4 staining of the PEO/ionic liquid phase was used to enhance contrast. The scale bars represent 100 nm. FIG. 11b shows the corresponding Fourier transform (FT) analysis of the TEM images above. Pixel intensity in the FTs was integrated azimuthally and plotted versus wavevector q in the inset. The upper curve is the integrated FT and the lower curve is the small-angle X-ray scattering (SAXS) data of the sample. The red arrow points to the feature in the FT that appears as a peak in the inset. The close agreement between peaks in the integrated FT and the SAXS data confirms that the TEM images accurately represent the bulk morphology.

Ionic Conductivity

Ionic conductivity was measured using 2-point probe impedance spectroscopy on a Solartron 1255B frequency response analyzer connected to a Solartron SI 1287 electrochemical interface. Bulk polymer electrolyte membrane samples were sanded to uniform thickness (about 0.5 mm) and sandwiched between stainless steel electrodes. Impedance was measured over the frequency range from $10^6$–1 Hz using a voltage amplitude of 100 mV. Bulk resistance, R, was determined from the frequency-independent plateau of the real part, Z', of impedance. Ionic conductivity, σ, was calculated as σ=l/(Ra), where l is the sample thick-ness and a is the superficial area. Thickness was measured with a Mitutoyo micrometer (1 um resolution) and area was measured using ImageJ software.

Samples were stored in either an Ar-filled glovebox or under dynamic vacuum. Each sample was heated under dynamic vacuum (100 mTorr) for at least one day prior to running impedance experiments. Impedance measurements were performed in an open atmosphere at temperatures from 30 to 150° C. in 10 degree increments. Each temperature was maintained for 1 hour prior to measurement to ensure thermal equilibration. Replicate measurements were performed in series to observe the effect of possible water absorption on the conductivity for temperatures below 100° C. The reproducibility of conductivity measurements over the entire temperature range for polymer electrolyte membranes that contained only ionic liquid indicated that these samples do not exhibit a strong affinity for water. Repeated measurements of the conductivity of LiTFSI containing samples, however, indicated that these samples were highly absorptive. For this reason, these samples were heated to 100° C. for 3 hours prior to measurement and temperatures were restricted to 100-150° C.

Figure 12:
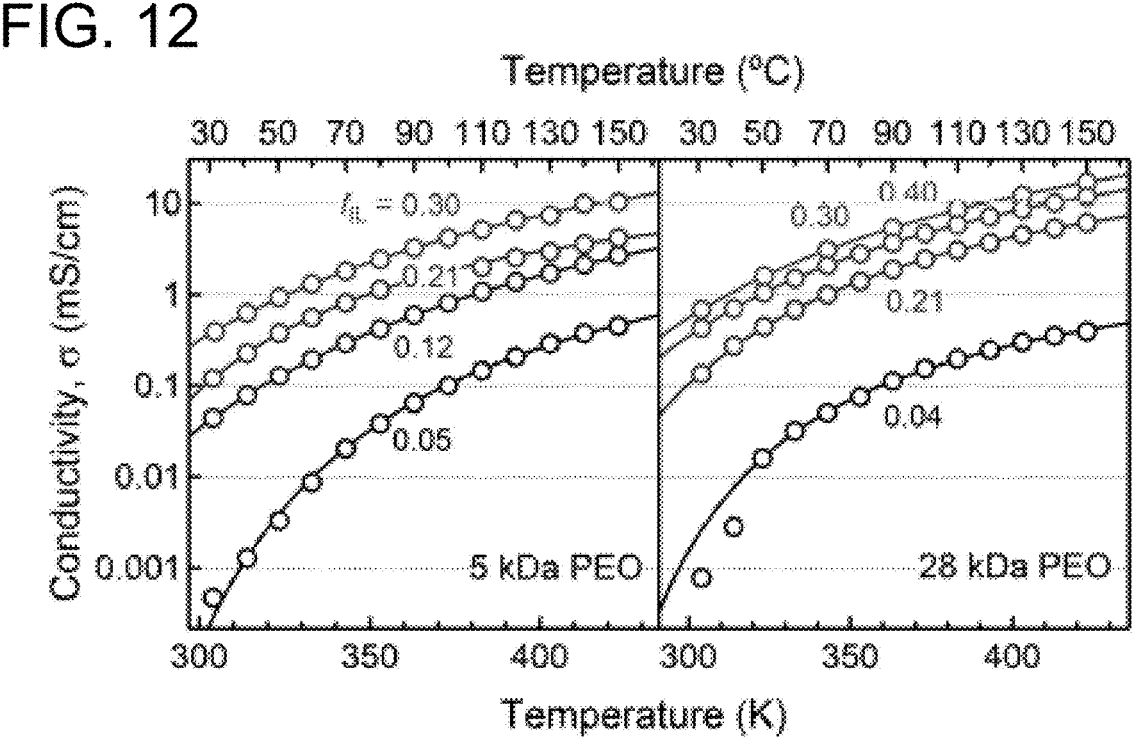
FIG. 12 are plots showing the conductivity of 5 kDa and 28 kDa samples including differing amounts of BMITFSI as a function of temperature.

FIG. 12 summarizes the ionic conductivity as a function of temperature of BMITFSI in PEO conducting channels for both 5 and 28 kDa PEO samples. Note that conductivity in this plot is reported in mS/cm, as the target conductivity for polymer electrolytes is 1 mS/cm. The parameter $f_{IL}$ gives the overall volume fraction of ionic liquid. Solid lines are fits of the data to the Vogel-Fulcher-Tammann functional form, given in Equation 1, which describes transport properties above the glass transition temperature in glass-forming liquids. This is the expected temperature-dependence for an ionic liquid/PEO mixture and corroborates that ions are migrating in PEO channels. In general, the conductivity increased with increasing temperature and ionic liquid content, and appears to be independent of the PEO molar mass. Promisingly, these PEMs can be prepared with ionic liquid over a wide composition window (5-50 vol % samples have been prepared to date) and operate over a wide temperature range (30-150° C.). To highlight one result, the conductivity of samples containing at least 21 vol % IL is higher than 1 mS/cm above 50° C., a requisite that is often cited for next-generation lithium ion PEMs.

Figure 13:
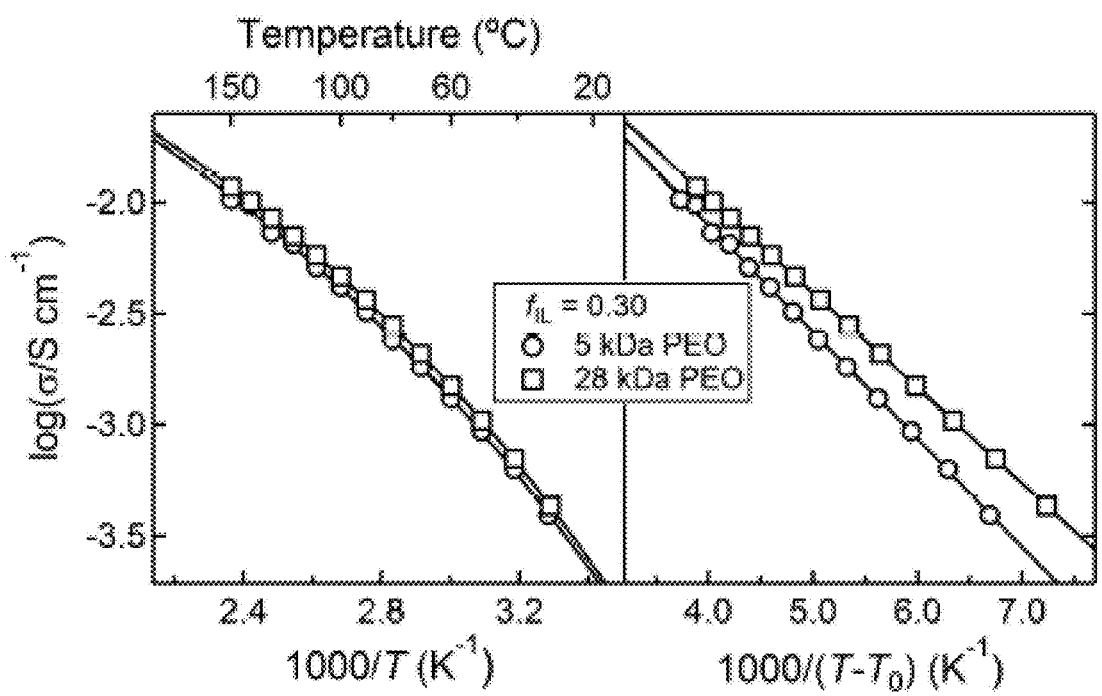
FIG. 13 are Arrhenius and Vogel-Fulcher-Tammann plots of the ionic conductivity of two PEM samples with 5 and 28 kDa PEO and 30 vol % BMITFSI.

In FIG. 13, conductivity data for samples prepared with 5 and 28 kDa PEO and 30 vol % BMITFSI are plotted in Arrhenius and Vogel-Fulcher-Tammann (VFT) plots. In contrast to traditional liquid electrolytes (e.g., salt in water), the data exhibit positive curvature in the Arrhenius plot and are linear in the VFT plot. This is a well-established result for polymer electrolytes and is consistent with ionic liquid migrating in PEO conducting channels. PEMs conductivity data were fit with excellent agreement to the VFT temperature dependence (Equation 2), which uses free-volume arguments to describe transport properties above a reference temperature, $T_0$, in glass-forming liquids.

$$\sigma = \sigma_0 \exp\left(\frac{-B}{T - T_0}\right) \quad (2)$$

Here, σ is the measured conductivity, $\sigma_0$ is a prefactor related to the number of ions, B is a pseudo-activation energy describing the entropic barrier to an ion hopping between void volumes, and $T_0$ is the reference temperature at which conductivity approaches zero.

Figure 14:
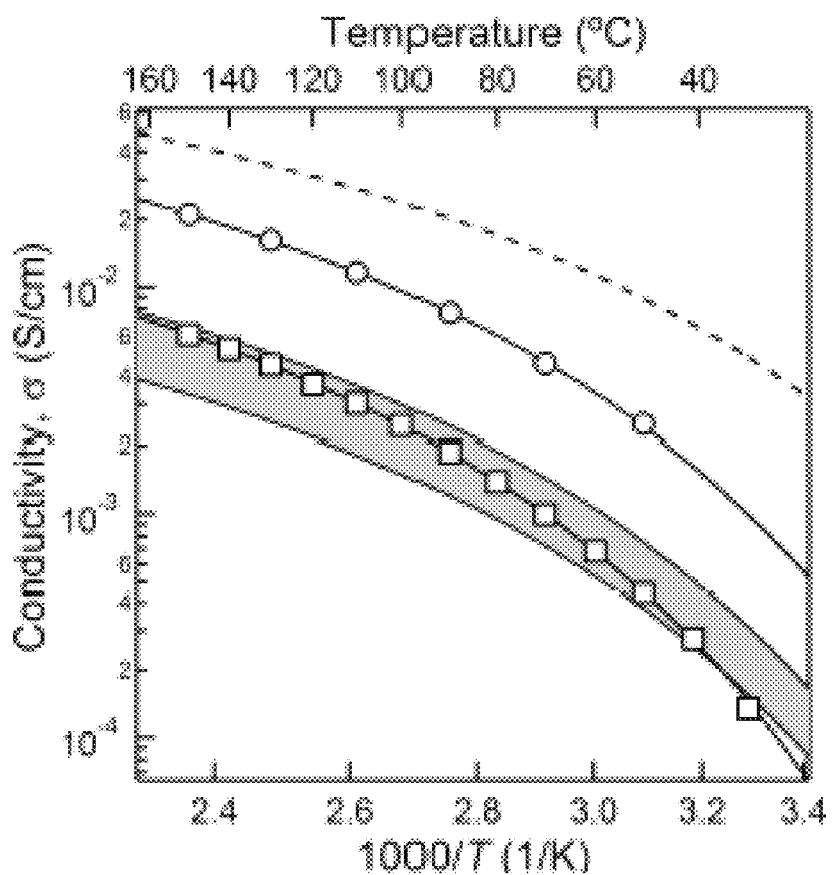
FIG. 14 are plots showing the conductivity of a PEM sample prepared with 28 kg/mol PEO-CTA and 21 vol % BMITSFA compared to the prediction given by Equation 1

FIG. 14 shows conductivity in a heterogeneous PEM sample (squares) is reduced relative to a PEO/ionic liquid homogeneous electrolyte (circles) of the same composition. The conductivity of pure BMITFSI (dashed line) is also shown for reference. The homogeneous electrolyte was prepared from an 8 kg mol−1 PEO homopolymer/BMITFSI mixture (50 vol %), and the heterogeneous PEM sample was prepared with 28 kg mol−1 PEO-CTA and BMITFSI at 21 overall vol %. In the conducting phase of the heterogeneous electrolyte, the resulting concentration of ionic liquid is 46 vol %. In both cases, only segmental motion contributes to ion transport. The shaded region is defined by a tortuosity of 1.5 (upper bound) and 3 (lower bound). Conductivity in heterogeneous electrolytes such as PEMs (in contrast to homogeneous electrolytes, as in the case of ionic liquid/ homopolymer mixtures) depends primarily on three factors. (i) The volume fraction of the conducting phase, given by $f_{PEO+IL}$. For the samples shown, $f_{PEO+IL}$=0.52. (ii) The mobility of ions in the conducting phase, which depends on the temperature interval above $T_g$. The local environment of an ion in the conducting phase of a heterogeneous electrolyte should be equivalent to that of a homogeneous electrolyte at equivalent concentration, and for this reason the PEO homopolymer control sample was prepared with roughly equivalent volume fraction of ionic liquid in PEO, $f_{IL\ in\ PEO+IL}$. (iii) The geometry and continuity of the conducting phase. The effect of geometry is quantified by the tortuosity, τ, but the continuity, or equivalently, the number of dead ends, is more ambiguous to quantify. Given the above considerations, we anticipate the conductivity in a heterogeneous electrolyte will be lower than the analogous (of equal $f_{(IL\ in\ PEO+IL)}$) homogeneous sample by $$\sigma_{hetero} = \sigma_{homo} \frac{f_{PEO+IL}}{\tau} \quad (3)$$

Equation 3 is represented in FIG. 14 by the shaded region, which was calculated assuming a range of tortuosity between 1.5 and 2.5. The important result from this analysis is that the measured conductivity of the PEMs samples is within the limits that the above equation predicts. That is, there are no dead-ends or grain boundaries to impede ion transport, and any salt that can be loaded into this system will exhibit the maximum conductivity allowed by geometric constraints.

Figure 15:
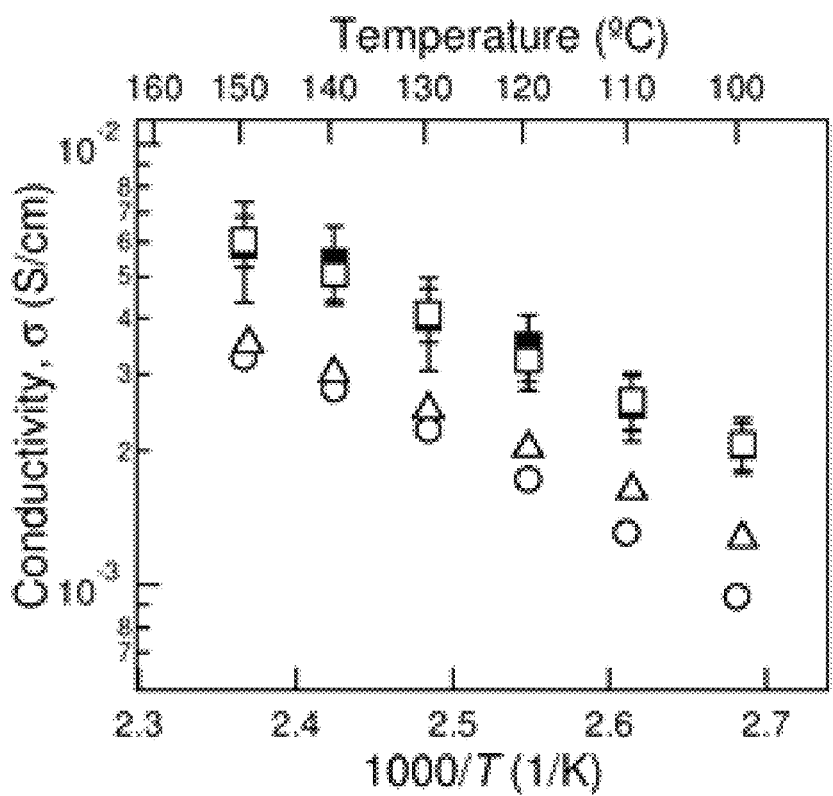
FIG. 15 are plots of ionic conductivity of mixtures of LiTFSI/MBITFSI in 5 kg/mol PEO-CTA PEMs.

FIG. 15 shows the measured ionic conductivity of mixtures of LiTFSI/BMITFSI in PEMs prepared with 5 kg/mol PEO-CTA. Mixtures were prepared at concentration of 1 (squares), 1.5 (up triangles), and 2 (circles) M LiTFSI in BMITFSI. For comparison, a sample prepared with pure BMITFSI (filled squares) and 5 kg/mol PEO-CTA is included. Error bars are one standard deviation based on at least three samples. The presence of $Li^+$ ions may be important for electrochemical device applications such as lithium ion batteries. When the concentration of LiTFSI increases from 1 to 2 M in BMITFSI (moving from open squares to open circles in FIG. 15), the measured conductivity decreased. This is consistent with the lower mobility of $Li^+$ relative to $BMI^+$ ions. Ionic liquid/lithium salt mixtures have been shown to exhibit better cyclability in batteries than pure lithium salts. Ionic liquid/lithium salt mixtures offer the additional advantage in the herein disclosed system of being more soluble in the initial reaction mixture than pure lithium salts. This sample is an important proof-of-concept because it proves that disclosed PEMs are viable candidates for lithium ion batteries.

Figure 16:
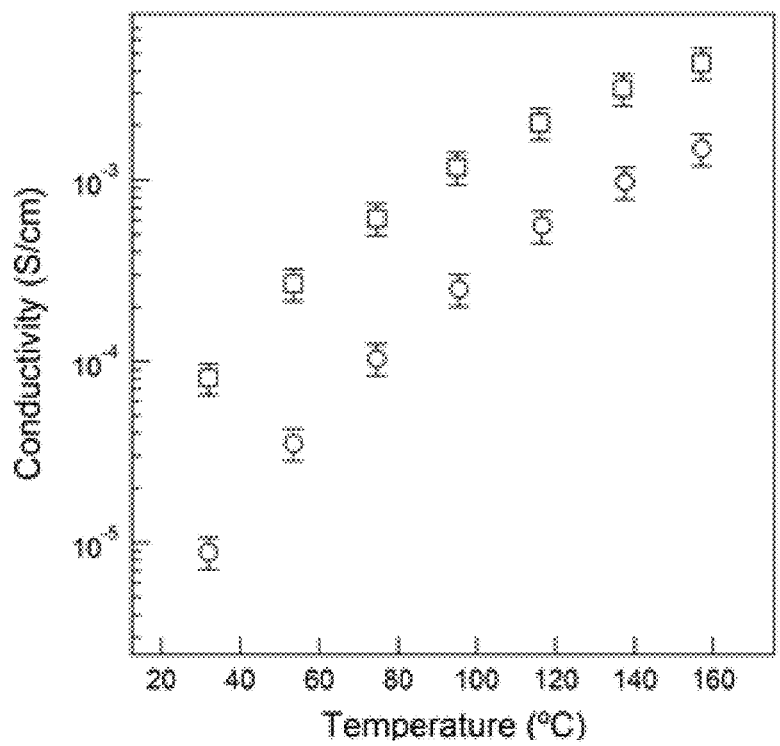
FIG. 16 show ionic conductivity of the ionic liquid BMITFSI in PEM samples prepared with 5 kg/mol PEO-CTA (32 wt %) plus acrylonitrile (AN) and divinylbenzene (DVB) (4/1 molar ratio AN/DVB).

FIG. 16 shows the measured ionic conductivity of acrylonitrile-based PEMs samples prepared samples prepared with 5 kg/mol PEO-CTA (32 wt %) plus acrylonitrile (AN) and divinylbenzene (DVB) (4/1 molar ratio AN/DVB). The overall concentration of BMITFSI is 31 (circles) and 44 (squares) vol %. Error bars represent ±20% error. The data are internally consistent, in that the sample with higher ionic liquid concentration exhibits higher conductivity. This result suggests that BMITFSI segregates to the PEO domain during the PIPS reaction. Furthermore, the relatively high conductivity suggests that the conducting domains are predominantly continuous. The conductivity is slightly lower than a poly(styrene)-based sample of equal ionic liquid concentration, although one of the samples still exceeds a 1 mS/cm benchmark at 100° C.

Mechanical Response

The mechanical response of the PEMs samples were measured in the linear viscoelastic regime using a TA Instruments RSA-G2 Solids Analyzer (TA Instruments). Samples for mechanical response experiments were polymerized in Teflon molds to yield samples with the appropriate geometry, typically tensile bars approximately 50×10×1 mm. To generate time-temperature superposition (tTS) master curves, samples were thermally equilibrated at a given temperature for at least 10 min, at which point a strain sweep was performed at a radial frequency of 10 rad/s to determine the limit of linear viscoelastic response. Next, a frequency sweep was performed at fixed strain over the frequency range from 100–0.1 rad/s. The raw data were shifted horizontally by visual alignment of the elastic modulus data; tan($\delta$) was not used because the viscous modulus data were typically too noisy to yield useable tan($\delta$) values.

Figure 17:
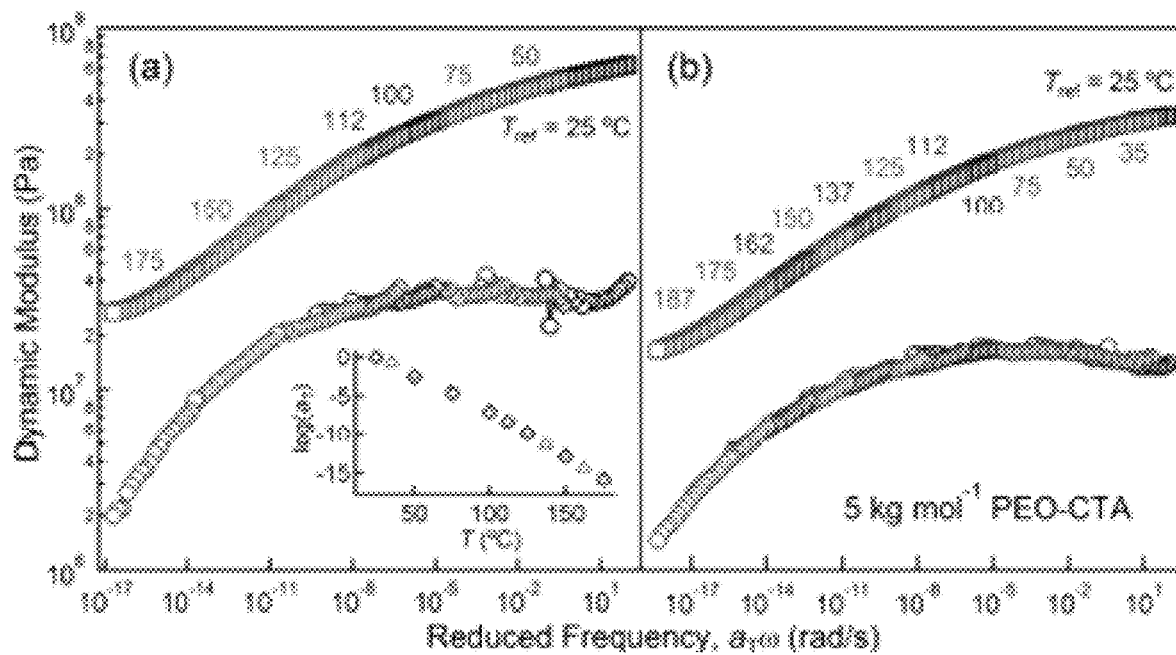
FIGS. 17 and 18 are linear viscoelastic master curves ($T_{ref}=25°$ C.) showing the mechanical response of PEM samples prepared from 5 kg mol−1 (FIG. 17) and 28 kg mol−1 (FIG. 18).
Figure 18:
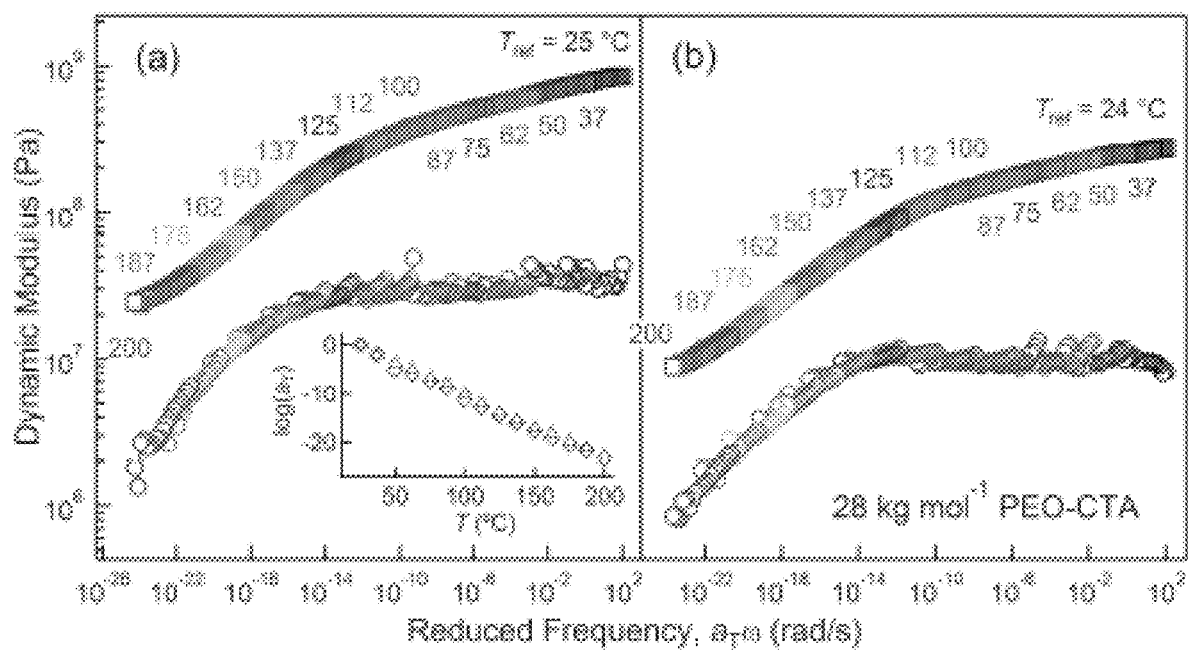

FIGS. 17 and 18 show linear viscoelastic master curves of representative polymer electrolyte membranes prepared from 5 kg mol−1 (FIG. 17) and 28 kg mol−1 (FIG. 18) PEO-CTA (a) without ionic liquid and (b) with 21 vol % BMITFSI. Frequency sweeps were collected from room temperature up to about 200° C. Numerals above the lines indicate the temperature of the corresponding frequency sweep. Data of (a) and (b) show the elastic modulus, E' (circles), and the viscous modulus, E" (squares), versus reduced frequency, aT$\omega$, for samples without ionic liquid and samples containing 21 vol % BMITFSI, respectively. E' is the elastic modulus and is proportional to the solid-like response of the material; E" is the viscous modulus and is proportional to the liquid-like material response. The inset graphs display the temperature-dependent shift factors, aT, for the sample without ionic liquid (triangles) and the sample with 21 vol % BMITFSI (diamonds). In general, these samples are stiff elastic solids (E'>>E") over a wide range of temperature, with moduli approaching 1 GPa at room temperature and softening to 10 MPa at temperatures above 150° C. The mechanical response of the PEMs outperforms commercially available diblock copolymer-based PEMs, which exhibit an elastic modulus around 10 MPa at room temperature and melt into viscous liquids above the $T_g$ of the glassy block. Chemical crosslinking in the P(S-co-DVB) of the PEMs ensures a solid response up to the decomposition temperature of the thermoset matrix.

Importantly, FIGS. 17 and 18 demonstrate that the addition of ionic liquid into the PEO domain does not substantially affect the overall mechanical response, which is dominated by the crosslinked P(S-co-DVB) domain. Equivalently, the stiff P(S-co-DVB) domain does not impede ion transport in the PEO conducting channels, as both samples shown here exhibit ionic conductivity within the limits allowed by Equation 1.

It is important to note that there is an upper limit to the addition of ionic liquid before mechanical properties suffer. This limitation is clear when approaching the limit where $f_{IL}$ equals 1, in which case the sample is a liquid. Progressive additions of ionic liquid drive the minority mechanically robust phase to segregate as discrete domains, altering the mechanical response to that of a soft solid or viscous liquid. Qualitatively, we have observed that samples prepared with greater than 30 vol % ionic liquid are not as stiff as samples prepared with lower concentration of ionic liquid.

The slight decrease in modulus observed upon addition of ionic liquid in both 5 and 28 kDa PEO samples can be explained by the co-continuity of both domains. In co-continuous composites like the exemplified PEMs, the observed modulus is, to a first-order approximation, a volume-weighted average of the modulus of each domain. For the temperatures shown here, the PEO/IL conducting phase is a liquid and contributes nothing to the overall modulus, so the measured modulus is simply the volume fraction-weight modulus of P(S-co-DVB). As an example, swelling the PEO domain of the 5 kDa sample with ionic liquid results in an increase in the volume fraction of the conducting phase by a factor of 1.5 (from 32 to 47 vol %), and a commensurate decrease in elastic modulus of a factor of 2 is observed.

Figures 19A, 19B:
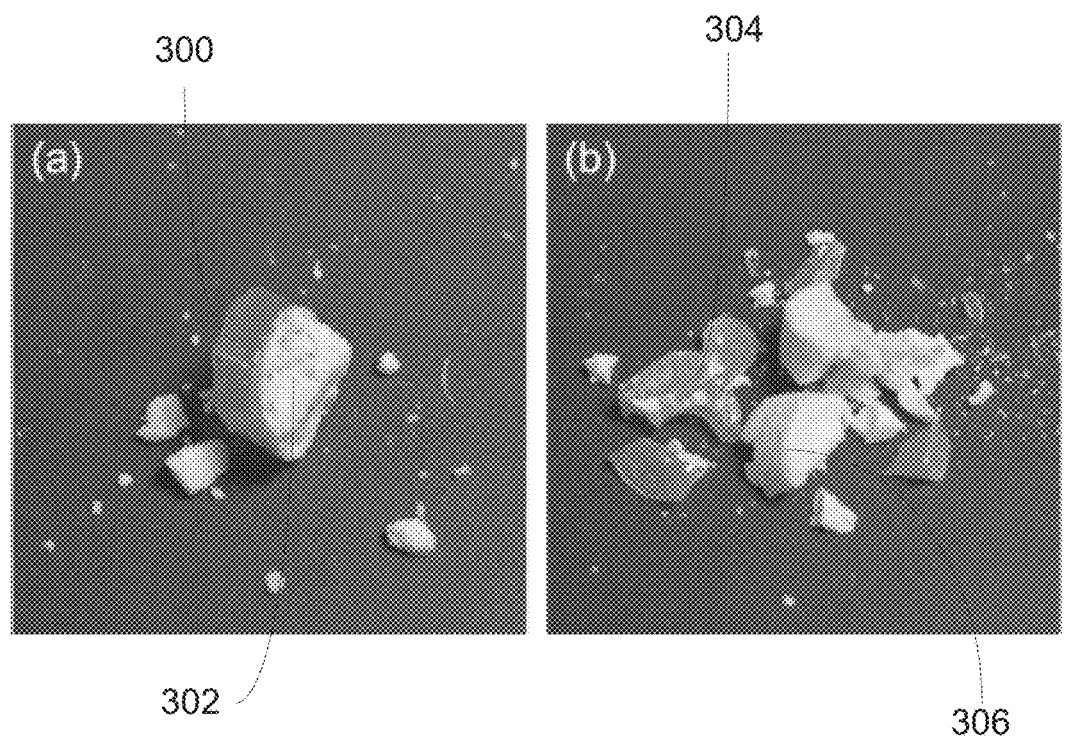
FIGS. 19a and 19b show photographs of the product of polymerization of styrene and divinylbenzene in the presence of free CTA and no PEO-CTA (FIG. 19a) and the product of polymerization of styrene and divinylbenzene in the presence of free CTA and 5 kg mol−1 PEO-OH (FIG. 19b).

FIGS. 19a and 19b show photographs of the macrophase separation observed in samples that are (a) the product of polymerization of styrene and divinylbenzene in the presence of free CTA and no PEO-CTA and (b) the product of polymerization of styrene and divinylbenzene in the presence of free CTA and 5 kg mol-1 PEO-OH. These experiments indicate that domain connectivity achieved in the in situ synthesis of a diblock copolymer is necessary to produce a homogeneous structure. Sample sizes are on the order of 1 cm. In FIG. 19a, the yellow material, indicated by reference numeral 300 contains CTA/P(S-co-DVB) and the white material, indicated by reference numeral 302 contains only P(S-co-DVB). In FIG. 19b, the yellow material, indicated by reference numeral 304 contains CTA/P(S-co-DVB) and the white material, indicated by reference numeral 306, likely contains both PEO and some P(S-co-DVB) but not CTA.

Table 2 shows properties of various samples made and characterized herein.

TABLE 2

| $M_n$ PEO-CTA (kg mol−1) | type of salt | Composition (vol %)[a] | | salt in PEO + salt domain[d] | $T_g$ (° C.) | $\Box H_m$ (J g−1) | crystallinity (%) |
|---|---|---|---|---|---|---|---|
| | | salt[b] | PEO + salt[c] | | | | |
| 5 | BMITFSI | 0 | 32 | 0 | −52 | 17.2 | 25 |
| 5 | BMITFSI | 5 | 35 | 15 | −58 | 18.2 | 28 |
| 5 | BMI/LiTFSI | 7 | 36 | 18 | — | — | — |
| 5 | BMITFSI | 21 | 47 | 45 | −58 | — | — |
| 5 | BMI/LiTFSI | 21 | 47 | 45 | — | — | — |
| 5 | BMITFSI | 30 | 52 | 57 | −61 | — | — |
| 5 | BMITFSI | 40 | 59 | 67 | | | |
| 28 | BMITFSI | 0 | 32 | 0 | — | 28.7 | 42 |
| 28 | BMITFSI | 4 | 32 | 12 | — | 28.1 | 43 |

TABLE 2-continued

| $M_n$ PEO-CTA (kg mol$^{-1}$) | type of salt | salt[b] | PEO + salt[c] | salt in PEO + salt domain[d] | $T_g$ (°C.) | $\Delta H_m$ (J g$^{-1}$) | crystallinity (%) |
|---|---|---|---|---|---|---|---|
| 28 | BMITFSI | 21 | 47 | 46 | −66 | 16.5 | 32 |
| 28 | BMITFSI | 30 | 52 | 59 | −64 | 10.9 | 25 |

[a]Composition was calculated using the known mass incorporated into the sample and the following densities (in g cm$^{-3}$): ρPSDVB = 1.05, ρPEO = 1.064, ρBMITFSI = 1.328, ρLiTFSI = 1.334
[b]Overall volume percent of ionic liquid or a mixture of ionic liquid and LiTFSI
[c]Volume percent of the conducting phase
[d]Volume percent of salt in the conducting phase Table 3 shows Vogel-Fulcher-Tammann (VFT) fit parameters for selected conductivity profiles in FIGS. 12 and 15.

TABLE 3

| | Composition (vol %) | | | | |
|---|---|---|---|---|---|
| type of salt | salt | PEO + salt | salt in PEO + salt domain | $\sigma_0$ (S/cm) | B (K) | $T_0$ (K) |
| BMITFSI | 40 | 59 | 67 | 0.59 | 884 | 178 |
| BMITFSI | 21 | 47 | 45 | 0.85 | 1333 | 152 |
| BMI/LiTFSI | 21 | 47 | 45 | 1.0 | 1467 | 136 |
| BMITFSI | 5 | 35 | 15 | 0.0064 | 749 | 223 |
| BMI/LiTFSI | 36 | 7 | 18 | 0.026 | 841 | 204 |

Thus, embodiments of polymer electrolyte membranes are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A method of forming a polymer electrolyte membrane, the method comprising:
   forming a reaction mixture comprising a macromolecular chain transfer agent, an ionic component, a monofunctional monomer, and a di- or greater functional monomer;
   simultaneously crosslinking and polymerizing the monomers in the reaction mixture to form a polymer electrolyte membrane having co-continuous domains comprising a conductive phase and a crosslinked network phase, wherein the crosslinked network phase is formed from the monofunctional monomer and di- or greater functional monomer.

2. The method according to claim 1 further comprising heating the reaction mixture, stirring the reaction mixture, or some combination thereof before the polymer electrolyte membrane is formed.

3. The method according to claim 1, wherein the polymer electrolyte membrane has a volume fraction of the ionic component from 0.0 to 0.5.

4. The method according to claim 1, wherein the molar ratio of the monofunctional monomer to the di- or greater functional monomer can be from 95:5 to 20:80.

5. The method according to claim 1 further comprising applying the reaction mixture to a surface before the polymer electrolyte membrane is formed from the reaction mixture.

6. The method according to claim 1, wherein the macromolecular chain transfer agent comprises a polyethylene oxide (PEO) chain transfer agent.

7. The method according to claim 1, wherein the monofunctional monomer comprises styrene or acrylonitrile and the di- or greater functional monomer comprises divinylbenzene.

8. The method according to claim 1, wherein the di- or greater functional monomer is a di-functional monomer.

9. The method according to claim 1, wherein the ionic component comprises an ionic liquid.

10. The method according to claim 1, wherein the ionic component comprises 1-butyl-3-methylimidazolium bis(trifluoromethylsulfonyl)imide (BMITFSI), 1-ethyl-3-methylimidazolium bis(trifluoromethylsulfonyl)imide (EMITFSI), lithium bis(trifluoromethylsulfonyl)imide (LiTFSI), 1-ethyl-3-methylimidazolium hexafluorophosphate (EMIPF$_6$), 1-butyl-3-methylimidazolium hexafluorophosphate (BMIPF$_6$), or combinations thereof.

11. The method according to claim 1, wherein the macromolecular chain transfer agent is 30% to 35% by weight with respect to the weight of total of the macromolecular chain transfer agent, the monofunctional monomer, and the di- or greater functional monomer.

12. A method of forming a polymer electrolyte membrane, the method comprising:
   forming a reaction mixture comprising a macromolecular chain transfer agent, an ionic component, a monofunctional monomer, and a di- or greater functional vinyl monomer;
   heating the reaction mixture to 100° C. or greater;
   mixing the reaction mixture; and
   forming the polymer electrolyte membrane from the reaction mixture utilizing controlled reversible addition-fragmentation chain transfer (RAFT) polymerization while simultaneously crosslinking the monomers;
   wherein the polymer electrolyte membrane has co-continuous domains comprising a conductive phase and a crosslinked network phase, wherein the crosslinked network phase is formed from the monofunctional monomer and di- or greater functional vinyl monomer.

13. The method according to claim 12 further comprising applying the reaction mixture to a surface before the polymer electrolyte membrane is formed from the reaction mixture.

14. The method according to claim 12, wherein the macromolecular chain transfer agent comprises a polyethylene oxide (PEO) chain transfer agent.

15. The method according to claim 12, wherein the monofunctional monomer comprises styrene or acrylonitrile and the di- or greater functional vinyl monomer comprises divinylbenzene.

16. The method according to claim 12, wherein the ionic component comprises 1-butyl-3-methylimidazolium bis(trifluoromethylsulfonyl)imide (BMITFSI), 1-ethyl-3-methylimidazolium bis(trifluoromethylsulfonyl)imide (EMITFSI), lithium bis(trifluoromethylsulfonyl)imide (LiTFSI), 1-ethyl-3-methylimidazolium hexafluorophosphate (EMIPF$_6$), 1-butyl-3-methylimidazolium hexafluorophosphate (BMIPF$_6$), or combinations thereof.

17. The method according to claim 12, wherein the polymer electrolyte membrane has a volume fraction of ionic component from 0.0 to 0.5.

18. The method according to claim 12, wherein the molar ratio of the monofunctional monomer to the di- or greater functional vinyl monomer can be from 95:5 to 20:80.

19. The method according to claim 12, wherein the molar ratio of the monofunctional monomer to the di- or greater functional vinyl monomer can be from 90:10 to 30:70.

20. The method according to claim 12, wherein the molar ratio of the monofunctional monomer to the di- or greater functional vinyl monomer can be about 4:1.

21. The method according to claim 12, wherein the di- or greater functional vinyl monomer is a di-functional monomer.

22. The method according to claim 12, wherein the ionic component comprises an ionic liquid.

23. The method according to claim 12, wherein the macromolecular chain transfer agent is 30% to 35% by weight with respect to the weight of total of the macromolecular chain transfer agent, the monofunctional monomer, and the di- or greater functional vinyl monomer.

* * * * *